US009442309B2

United States Patent
Pugh et al.

(10) Patent No.: US 9,442,309 B2
(45) Date of Patent: Sep. 13, 2016

(54) METHOD AND APPARATUS FOR OPHTHALMIC DEVICES COMPRISING DIELECTRICS AND NANO-SCALED DROPLETS OF LIQUID CRYSTAL

(71) Applicant: Johnson & Johnson Vision Care, Inc., Jacksonville, FL (US)

(72) Inventors: Randall B. Pugh, St. Johns, FL (US); Frederick A. Flitsch, New Windsor, NY (US); James Daniel Riall, St. Johns, FL (US); Praveen Pandojirao-S, Jacksonville, FL (US); Adam Toner, Jacksonville, FL (US); Stephen R. Beaton, Jacksonville, FL (US); Nelson V. Tabirian, Winter Park, FL (US); Svetlana Serak, Oviedo, FL (US); Olena Uskova, Winter Park, FL (US); Luciano De Sio, Winter Park, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 297 days.

(21) Appl. No.: 14/172,314

(22) Filed: Feb. 4, 2014

(65) Prior Publication Data

US 2015/0077660 A1    Mar. 19, 2015

Related U.S. Application Data

(60) Provisional application No. 61/878,723, filed on Sep. 17, 2013.

(51) Int. Cl.
*G02C 7/02* (2006.01)
*G02C 1/00* (2006.01)
(Continued)

(52) U.S. Cl.
CPC .............. *G02C 7/083* (2013.01); *G02C 7/04* (2013.01); *G02F 1/1334* (2013.01); *G02F 2001/294* (2013.01)

(58) Field of Classification Search
USPC .............. 351/200–246, 159, 2, 159.03, 158, 351/160 R, 161, 163, 41, 45, 159.02
See application file for complete search history.

(56) References Cited

U.S. PATENT DOCUMENTS 5,682,210 A   10/1997  Weirich
6,120,460 A    9/2000  Abreu
(Continued)

FOREIGN PATENT DOCUMENTS

EP    1947501 A2    7/2008
EP    2063311 A1    5/2009
(Continued)

OTHER PUBLICATIONS

Asatryan, K., et al., "Optical Lens With Electrically Variable Focus Using an Optically Hidden Dielectric Structure", Optics Express, vol. 18, No. 13, pp. 13981-13992 (2010), Dec. 2012.
(Continued)

*Primary Examiner* — Mohammed Hasan
(74) *Attorney, Agent, or Firm* — Carl J. Evens

(57) ABSTRACT

This invention discloses methods and apparatus for providing a variable optic insert into an ophthalmic lens. The variable optic insert may have surfaces within that have differing radii of curvature. A liquid crystal layer may be used to provide a variable optic function and in some embodiments, the liquid crystal layer may comprise droplets that are nano-scaled. An energy source is capable of powering the variable optic insert included within the ophthalmic lens. In some embodiments, an ophthalmic lens is cast-molded from a silicone hydrogel. The various ophthalmic lens entities may include electroactive liquid crystal layers to electrically control refractive characteristics.

20 Claims, 12 Drawing Sheets

(51) Int. Cl.
*G02C 7/08* (2006.01)
*G02C 7/04* (2006.01)
*G02F 1/1334* (2006.01)
*G02F 1/29* (2006.01)

(56) References Cited

U.S. PATENT DOCUMENTS

| | | |
|---|---|---|
| 6,312,393 B1 | 11/2001 | Abreu |
| 6,364,483 B1 | 4/2002 | Grossinger |
| 6,570,386 B2 | 5/2003 | Goldstein |
| 7,018,040 B2 | 3/2006 | Blum et al. |
| 7,169,106 B2 | 1/2007 | Fleischman et al. |
| 7,626,562 B2 | 12/2009 | Iwasaki |
| 7,708,401 B2 | 5/2010 | Sabata |
| 7,931,832 B2 | 4/2011 | Pugh et al. |
| 8,047,651 B2 | 11/2011 | Blum |
| 8,602,560 B2 | 12/2013 | Marin |
| 8,906,088 B2* | 12/2014 | Pugh ............... G02C 7/049 623/6.22 |
| 2004/0021929 A1 | 2/2004 | Nishioka |
| 2004/0027536 A1 | 2/2004 | Blum |
| 2005/0003107 A1 | 1/2005 | Kumar |
| 2005/0062679 A1 | 3/2005 | Aharoni et al. |
| 2005/0140924 A1 | 6/2005 | Blum et al. |
| 2005/0151926 A1 | 7/2005 | Kumar |
| 2006/0209238 A1 | 9/2006 | Shiraogawa |
| 2008/0208335 A1 | 8/2008 | Blum |
| 2008/0278675 A1 | 11/2008 | Escuti |
| 2009/0033863 A1 | 2/2009 | Blum |
| 2009/0076367 A1 | 3/2009 | Sit et al. |
| 2009/0316097 A1 | 12/2009 | Presniakov |
| 2010/0001926 A1 | 1/2010 | Amirparviz et al. |
| 2010/0103368 A1 | 4/2010 | Amirparviz et al. |
| 2010/0302490 A1 | 12/2010 | Chiu |
| 2011/0028807 A1 | 2/2011 | Abreu |
| 2011/0184271 A1 | 7/2011 | Veciana et al. |
| 2011/0188120 A1 | 8/2011 | Tabirian |
| 2011/0262844 A1 | 10/2011 | Tabirian |
| 2011/0292306 A1 | 12/2011 | Kim |
| 2012/0140167 A1 | 6/2012 | Blum |
| 2012/0188467 A1 | 7/2012 | Escuti |
| 2012/0212696 A1 | 8/2012 | Trajkovska |
| 2012/0224127 A1 | 9/2012 | Kwok |
| 2012/0229754 A1 | 9/2012 | Iyer |
| 2013/0050639 A1 | 2/2013 | Trajkovska |
| 2013/0077013 A1 | 3/2013 | Yamazaki |
| 2013/0166025 A1* | 6/2013 | Pugh ............... G02C 7/049 623/6.22 |
| 2013/0208347 A1 | 8/2013 | Haddock |
| 2013/0245754 A1 | 9/2013 | Blum |
| 2014/0036172 A1 | 2/2014 | Trajkovska-Broach et al. |
| 2014/0132904 A1 | 5/2014 | Bos et al. |
| 2014/0327875 A1 | 11/2014 | Blum et al. |
| 2015/0077662 A1 | 3/2015 | Pugh |
| 2015/0138454 A1* | 5/2015 | Pugh ............... A61F 2/1627 349/13 |

FOREIGN PATENT DOCUMENTS

| | | |
|---|---|---|
| EP | 2431790 A1 | 3/2012 |
| JP | 11352445 A | 12/1999 |
| WO | WO0049452 A1 | 8/2000 |
| WO | WO2006078806 A2 | 7/2006 |
| WO | WO2008/091859 A1 | 7/2008 |
| WO | WO2008091859 A1 | 7/2008 |
| WO | WO2009048647 A1 | 4/2009 |
| WO | WO2012103497 A1 | 8/2012 |
| WO | WO2012122411 A1 | 9/2012 |
| WO | WO2013096781 A1 | 6/2013 |
| WO | WO2013113278 A1 | 8/2013 |

OTHER PUBLICATIONS

Hoogboom, J., et al., "LCD Alignment Layers, Controlling Nematic Domain Properties", Journal of Material Chemistry, vol. 16, pp. 1305-1314 (2006).

Laude, Vincent "Twisted-Nematic Liquid-Crystal Pixelated Active Lens", Optics Communications, vol. 153, pp. 134-152 (1998) Dec. 2012.

Birefringence in Liquid Crystals, http://plc.cwru.edu/tutorial/enhanced/files/lc/biref/biref.htm, pp. 1-4, Dec. 10, 2012.

De Smet, J. et al., "Design and Wrinkling Behavior of a Contact Lens with an Integrated Liquid Crystal Light Modulator", Journal of Display Technology, May 31, 2012, vol. 8, No. 5, pp. 229-305.

Ren, H. et al., "Tunable-Focus Microlens Arrays using Nanosized Polymer-Dispered Liquid Crystal Droplets", Optics Communications, Mar. 1, 2005, vol. 247, No. 1-3, pp. 101-106.

Ren Hongwen et al., "Tunable Fresnel Lens Using Nanoscale Polymer-Dispersed Liquid Crystals", Applied Physics Letters, American Institute of Physics, vol. 83, No. 8, Aug. 25, 2003, pp. 1515-1517.

Nersisyan S. R. et al., "The Principals of Laser Beam Control with Polarization Gratings Introduced as Diifractive Waeplates", Proceedings of Spie, SPIE International Society for Optical Engineering, vol. 7775, Aug. 1, 2010, pp. 77750.

L. Marrucci, et al., "Pancharatnam-Berry phase optical elements for wave front shaping in the visible domain: Switchable helical mode generation", Applied Physics Letters 88, 221102-1, 2006.

Ervin Goldfain, "exact Raytracing Formulae for Parabolic Axial Grin Lenses", Gradient Index, Miniature, and Diffractive Optical Systems, vol. 3778, pp. 2-10.

Serak, S.V., Polarization-controlled switching in cycloidal nematic liquid crystals, Optical Society of America, Oct. 10, 2006.

* cited by examiner

METHOD AND APPARATUS FOR OPHTHALMIC DEVICES COMPRISING DIELECTRICS AND NANO-SCALED DROPLETS OF LIQUID CRYSTAL

CROSS REFERENCE TO RELATED APPLICATIONS

This application claims priority to Provisional Application No. 61/878,723 filed Sep. 17, 2013.

BACKGROUND OF THE INVENTION

1. Field of the Invention

The present invention relates to an ophthalmic lens device with a variable optic capability and, more specifically, in some embodiments, the fabrication of an ophthalmic lens with a variable optic insert utilizing liquid crystal elements.

2. Discussion of the Related Art

Traditionally an ophthalmic lens, such as a contact lens or an intraocular lens provided a predetermined optical quality. A contact lens, for example, may provide one or more of the following: vision correcting functionality; cosmetic enhancement; and therapeutic effects, but only a set of vision correction functions. Each function is provided by a physical characteristic of the lens. Basically, a design incorporating a refractive quality into a lens provides vision corrective functionality. A pigment incorporated into the lens may provide a cosmetic enhancement. An active agent incorporated into a lens may provide a therapeutic functionality.

To date, optical quality in an ophthalmic lens has been designed into the physical characteristic of the lens. Generally, an optical design has been determined and then imparted into the lens during fabrication of the lens, for example through cast molding, or lathing. The optical qualities of the lens have remained static once the lens has been formed. However, wearers may at times find it beneficial to have more than one focal power available to them in order to provide sight accommodation. Unlike spectacle wearers, who can change spectacles to change an optical correction, contact wearers or those with intraocular lenses have not been able to change the optical characteristics of their vision correction without significant effort or the complementing of spectacles with contact lenses or intraocular lenses.

SUMMARY OF THE INVENTION

Accordingly, the present invention includes innovations relating to a variable optic insert with liquid crystal elements that may be energized and incorporated into an ophthalmic device, which is capable of changing the optical quality of the device. Examples of such ophthalmic devices may include a contact lens or an intraocular lens. In addition, methods and apparatus for forming an ophthalmic lens with a variable optic insert with liquid crystal elements are presented. Some embodiments may also include a cast-molded silicone hydrogel contact lens with a rigid or formable energized insert, which additionally includes a variable optic portion, wherein the insert is included within the ophthalmic lens in a biocompatible fashion.

The present invention therefore includes disclosure of an ophthalmic lens with a variable optic insert, apparatus for forming an ophthalmic lens with a variable optic insert, and methods for manufacturing the same. An energy source may be deposited or assembled onto a variable optic insert and the insert may be placed in proximity to one, or both of, a first mold part and a second mold part. A composition comprising a reactive monomer mixture (hereafter referred to as a reactive monomer mixture) is placed between the first mold part and the second mold part. The first mold part is positioned proximate to the second mold part thereby forming a lens cavity with the energized media insert and at least some of the reactive monomer mixture in the lens cavity; the reactive monomer mixture is exposed to actinic radiation to form an ophthalmic lens. Lenses are formed via the control of actinic radiation to which the reactive monomer mixture is exposed. In some embodiments, an ophthalmic lens skirt or an insert-encapsulating layer may be comprised of standard hydrogel ophthalmic lens formulations. Exemplary materials with characteristics that may provide an acceptable match to numerous insert materials may include, for example, the Narafilcon family (including Narafilcon A and Narafilcon B), the Etafilcon family (including Etafilcon A), Galyfilcon A and Senofilcon A.

The methods of forming the variable optic insert with liquid crystal elements and the resulting inserts are important aspects of various embodiments. In some embodiments, the liquid crystal may be located between two alignment layers, which may set the resting orientation for the liquid crystal. Those two alignment layers may be in electrical communication with an energy source through electrodes deposited on substrate layers that contain the variable optic portion. The electrodes may be energized through an intermediate interconnect to an energy source or directly through components embedded in the insert.

The energization of the alignment layers may cause a shift in the liquid crystal from a resting orientation to an energized orientation. In embodiments that operate with two levels of energization, on or off, the liquid crystal may only have one energized orientation. In other alternative embodiments, where energization occurs along a scale of energy levels, the liquid crystal may have multiple energized orientations. Still further embodiments may derive where the energization process may cause a switch between different states through an energization pulse.

The resulting alignment and orientation of the molecules may affect light that passes through the liquid crystal layer thereby causing the variation in the variable optic insert. For example, the alignment and orientation may act with refractive characteristics upon the incident light. Additionally, the effect may include alteration of polarization of the light. Some embodiments may include a variable optic insert wherein energization alters a focal characteristic of the lens.

In some embodiments, the liquid crystal layer may be formed in a manner wherein a polymerizable mixture comprising liquid crystal molecules is caused to polymerize. By controlling the polymerization in various manners, droplets of liquid crystal molecules may separate from the polymerized layer as it forms. In some embodiments, the process may be controlled such that the droplets are nano-scaled which may mean that the average or median diameter of the collection of droplets is less than roughly 1 micron in length. In some further versions the average or median diameter may also be less than roughly 0.1 micron in length.

Accordingly, in some embodiments an ophthalmic device may be formed by the incorporation of a variable optic insert comprising liquid crystal molecules within an ophthalmic device. The variable insert may comprise at least a portion which may be located in the optic zone of the ophthalmic device. The variable insert may comprise a front insert piece and a back insert piece. The front and back insert piece may have either or both of their surfaces curved in various manners, and in some embodiments the radius of curvature of a back surface on the front insert piece may be different from the radius of curvature of the front surface of the back insert piece. An energy source may be included into the lens and into the insert and in some embodiments the energy source may be located wherein at least a portion of the energy source is in the non-optic zone of the device.

In some embodiments the layer comprising droplets of liquid crystal material may be further defined such that within the layer comprised of droplets of liquid crystal material the region comprising the droplets is a subset of the layer comprising liquid crystal material and has a shaped profile capable of causing an optical effect supplementary to the effect of the regionally varied dielectric thicknesses of insert surfaces.

In some embodiments the layer comprising droplets of liquid crystal material may be further defined such that within the layer comprised of droplets of liquid crystal material the density of the droplets is spatially varied such that the variation is capable of causing an optical effect supplementary to the effect of the regionally varied dielectric thicknesses of insert surfaces.

The insert may comprise at least a first liquid crystal material and the liquid crystal material may also be found in the droplets where the average or median diameter of a collection of the droplets may have diameters less than a micron in length or be considered to be nano-scaled.

In some embodiments the ophthalmic device may be a contact lens.

In some embodiments the insert of the ophthalmic device may comprise electrodes made of various materials, including transparent materials such as ITO as a non-limiting example. A first electrode may be located proximate to a back surface of a front curve piece, and a second electrode may be located proximate to a front surface of a back curve piece. When an electric potential is applied across the first and second electrodes, an electric field may be established across a liquid crystal layer located between the electrodes. The application of an electric field across the liquid crystal layer may cause liquid crystal molecules within the layer to physically align with the electric field. In some embodiments, the liquid crystal molecules may be located in droplets within the layer and in some embodiments the droplets may have average diameters less than 1 micron in dimension. When the liquid crystal molecules align with the electric filed, the alignment may cause a change in the optical characteristics that a light ray may perceive as it traverses the layer containing liquid crystal molecules. A non-limiting example may be that the index of refraction may be altered by the change in alignment. In some embodiments, the change in optical characteristics may result in a change in focal characteristics of the lens which contains the layer containing liquid crystal molecules.

In some embodiments, the ophthalmic devices as described may include a processor.

In some embodiments, the ophthalmic devices as described may include an electrical circuit. The electrical circuit may control or direct electric current to flow within the ophthalmic device. The electrical circuit may control electrical current flow from an energy source to the first and second electrode elements.

The insert device may comprise more than a front insert piece and a back insert piece in some embodiments. An intermediate piece or pieces may be located between the front insert piece and the back insert piece. In an example, a liquid crystal containing layer may be located between the front insert piece and the intermediate piece. The insert may comprise at least a portion which may be located in the optic zone of the ophthalmic device. The front, intermediate and back insert piece may have either or both of their surfaces curved in various manners, and in some embodiments the radius of curvature of a back surface on the front insert piece may be different from the radius of curvature of the front surface of the intermediate insert piece. An energy source may be included into the lens and into the insert and in some embodiments the energy source may be located wherein at least a portion of the energy source is in the non-optic zone of the device.

The insert with a front insert piece, a back insert piece and at least a first intermediate insert piece may comprise at least a first liquid crystal molecule, and the liquid crystal molecule or molecules may also be found in the droplets where the average or median diameter of a collection of the droplets may have diameters less than a micron in length or be considered to be nano-scaled.

In some embodiments with a front insert piece, a back insert piece and at least a first intermediate insert piece the ophthalmic device may be a contact lens.

In some embodiments the insert of the ophthalmic device with a front insert piece, a back insert piece and at least a first intermediate insert piece may comprise electrodes made of various materials, including transparent materials such as ITO as a non-limiting example. A first electrode may be located proximate to a back surface of a front curve piece, and a second electrode may be located proximate to a front surface of an intermediate piece. When an electric potential is applied across the first and second electrodes, an electric field may be established across a liquid crystal layer located between the electrodes. The application of an electric field across the liquid crystal layer may cause liquid crystal molecules within the layer to physically align with the electric field. In some embodiments, the liquid crystal molecules may be located in droplets within the layer and in some embodiments the droplets may have average diameters less than 1 micron in dimension. When the liquid crystal molecules align with the electric filed, the alignment may cause a change in the optical characteristics that a light ray may perceive as it traverses the layer containing liquid crystal molecules. A non-limiting example may be that the index of refraction may be altered by the change in alignment. In some embodiments, the change in optical characteristics may result in a change in focal characteristics of the lens which contains the layer containing liquid crystal molecules.

In some embodiments the intermediate piece may comprise multiple pieces that are joined together.

In some embodiments where the insert device may be comprised of a front insert piece, a back insert piece and an intermediate piece or pieces, a liquid crystal containing layer may be located between the front insert piece and the intermediate piece or between the intermediate piece and the back insert piece. In addition, a polarizing element may be located within the variable insert device as well. The variable insert may comprise at least a portion which may be located in the optic zone of the ophthalmic device. The front, intermediate and back insert pieces may have either or both of their surfaces curved in various manners, and in some embodiments the radius of curvature of a back surface on the front insert piece may be different from the radius of curvature of the front surface of the intermediate insert piece. An energy source may be included into the lens and into the insert and in some embodiments the energy source may be located wherein at least a portion of the energy source is in the non-optic zone of the device.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE INVENTION

Figure 1:
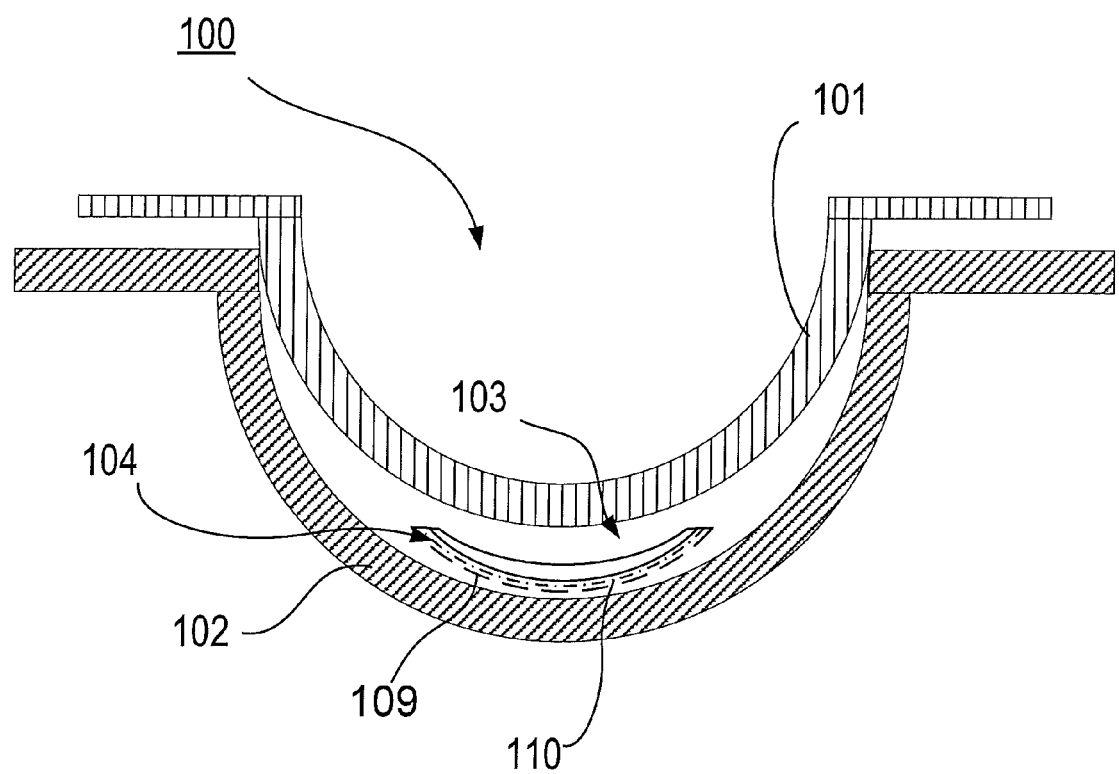
FIG. 1 illustrates exemplary mold assembly apparatus components that may be useful in implementing some embodiments of the present invention.

The present invention includes methods and apparatus for manufacturing an ophthalmic lens with a variable optic insert wherein the variable optic portion comprises a liquid crystal or a composite material which itself includes liquid crystal constituents. In addition, the present invention includes an ophthalmic lens with a variable optic insert comprising a liquid crystal incorporated into the ophthalmic lens.

According to the present invention, an ophthalmic lens is formed with an embedded insert and an energy source, such as an electrochemical cell or battery as the storage means for the energy. In some exemplary embodiments, the materials comprising the energy source may be encapsulated and isolated from an environment into which an ophthalmic lens is placed. In some exemplary embodiments the energy source may include alkaline electrochemical cell chemistry which may be used in a primary or rechargeable configuration.

A wearer-controlled adjustment device may be used to vary the optic portion. The adjustment device may include, for example, an electronic device or passive device for increasing or decreasing a voltage output or engaging and disengaging the energy source.

Some exemplary embodiments may also include an automated adjustment device to change the variable optic portion via an automated apparatus according to a measured parameter or a wearer input. Wearer input may include, for example, a switch controlled by wireless apparatus. Wireless may include, for example, radio frequency control, magnetic switching, patterned emanations of light, and inductance switching. In other exemplary embodiments activation may occur in response to a biological function or in response to a measurement of a sensing element within the ophthalmic lens. Other exemplary embodiments may result from the activation being triggered by a change in ambient lighting conditions as a non-limiting example.

Variation in optic power may occur when electric fields, created by the energization of electrodes, causes realignment within the liquid crystal layer thereby shifting the molecules from the resting orientation to an energized orientation. In other alternative exemplary embodiments, different effects caused by the alteration of liquid crystal layers by energization of electrodes may be exploited, for example, by changing of the light polarization state, particularly, polarization rotation.

In some exemplary embodiments with liquid crystal layers, there may be elements in the non-optical zone portion of the ophthalmic lens that may be energized, whereas other embodiments may not require energization. In the embodiments without energization, the liquid crystal may be passively variable based on some exterior factor, for example, ambient temperature, or ambient light.

A liquid crystal lens may provide an electrically variable index of refraction to polarized light incident upon its body. A combination of two lenses where the optical axis orientation is rotated in the second lens relative to the first lens allows for a lens element that may be able to vary the index of refraction to ambient non-polarized light.

By combining electrically active liquid crystal layers with electrodes, a physical entity may derive that may be controlled by applying an electrical field across the electrodes. If there is a dielectric layer that is present on the periphery of the liquid crystal layer then the field across the dielectric layer and the field across the liquid crystal layer may combine into the field across the electrodes. In a three dimensional shape the nature of the combination of the fields across the layers may be estimated based on electrodynamics principals and the geometry of the dielectric layer and the liquid crystal layer. If the effective electrical thickness of the dielectric layer is made in a non-uniform manner then the effect of a field across the electrodes may be "shaped" by the effective shape of the dielectric and create dimensionally shaped changes in refractive index in the liquid crystal layers. In some exemplary embodiments, such shaping may result in lenses that have the ability to adopt variable focal characteristics.

An alternative exemplary embodiment may derive when the physical lens elements that contain the liquid crystal layers are shaped themselves to have different focal characteristics. The electrically variable index of refraction of a liquid crystal layer may then be used to introduce changes in focal characteristics of the lens based on the application of an electric field across the liquid crystal layer through the use of electrodes. The index of refraction of a liquid crystal layer may be referred to as an effective index of refraction, and it may be possible to consider each treatment relating to an index of refraction as equivalently referring to an effective index of refraction. The effective index of refraction may come, for example, from the superposition of multiple regions with different index of refraction. In some exemplary embodiments, the effective aspect may be an average of the various regional contributions, while in other exemplary embodiments the effective aspect may be a superposition of the regional or molecular effects upon incident light. The shape that the front containment surface makes with the liquid crystal layer and the shape that the back containment surface makes with the liquid crystal layer may determine to first order the focal characteristics of the system.

In the following sections detailed descriptions of embodiments of the invention will be given. The description of both preferred and alternative embodiments are exemplary embodiments only, and it is understood that to those skilled in the art that variations, modifications and alterations may be apparent. It is therefore to be understood that said exemplary embodiments do not limit the scope of the underlying invention.

GLOSSARY

In this description and claims directed to the presented invention, various terms may be used for which the following definitions will apply:

Alignment layer: as used herein refers to a layer adjacent to a liquid crystal layer that influences and aligns the orientation of molecules within the liquid crystal layer. The resulting alignment and orientation of the molecules may affect light that passes through the liquid crystal layer. For example, the alignment and orientation may act with refractive characteristics upon the incident light. Additionally, the effect may include alteration of polarization of the light.

Electrical Communication: as used herein refers to being influenced by an electrical field. In the case of conductive materials, the influence may result from or in the flow of electrical current. In other materials, it may be an electrical potential field that causes an influence, such as the tendency to orient permanent and induced molecular dipoles along field lines as an example.

Energized: as used herein refers to the state of being able to supply electrical current to or to have electrical energy stored within.

Energized orientation: as used herein refers to the orientation of the molecules of a liquid crystal when influenced by an effect of a potential field powered by an energy source. For example, a device containing liquid crystals may have one energized orientation if the energy source operates as either on or off. In other exemplary embodiments, the energized orientation may change along a scale affected by the amount of energy applied.

Energy: as used herein refers to the capacity of a physical system to do work. Many uses within this invention may relate to the capacity being able to perform electrical actions in doing work.

Energy source: as used herein refers to device capable of supplying energy or placing a biomedical device in an energized state.

Energy Harvesters: as used herein refers to device capable of extracting energy from the environment and convert it to electrical energy.

Intraocular lens: as used herein refers to an ophthalmic lens that is embedded within the eye.

Lens-Forming Mixture or Reactive Mixture or reactive monomer mixture (RMM): as used herein refers to a monomer or prepolymer material that may be cured and cross-linked or crosslinked to form an ophthalmic lens. Various exemplary embodiments may include lens-forming mixtures with one or more additives such as: UV blockers, tints, photoinitiators or catalysts, and other additives one might desire in an ophthalmic lens such as, for example, contact or intraocular lenses.

Lens-Forming Surface: as used herein refers to a surface that is used to mold a lens. In some exemplary embodiments, any such surface may have an optical quality surface finish, which indicates that it is sufficiently smooth and formed so that a lens surface fashioned by the polymerization of a lens-forming mixture in contact with the molding surface is optically acceptable. Further, in some embodiments, the lens-Forming Surface may have a geometry that is necessary to impart to the lens surface the desired optical characteristics, including, for example, spherical, aspherical and cylinder power, wave front aberration correction, and corneal topography correction.

Liquid Crystal: as used herein refers to a state of matter having properties between a conventional liquid and a solid crystal. A liquid crystal cannot be characterized as a solid but its molecules exhibit some degree of alignment. As used herein, a liquid crystal is not limited to a particular phase or structure, but a liquid crystal may have a specific resting orientation. The orientation and phases of a liquid crystal may be manipulated by external forces, for example, temperature, magnetism, or electricity, depending on the class of liquid crystal.

Lithium Ion Cell: as used herein refers to an electrochemical cell where Lithium ions move through the cell to generate electrical energy. This electrochemical cell, typically called a battery, may be reenergized or recharged in its typical forms.

Media insert or insert: as used herein refers to a formable or rigid substrate capable of supporting an energy source within an ophthalmic lens. In some exemplary embodiments, the media insert also includes one or more variable optic portions.

Mold: as used herein refers to a rigid or semi-rigid object that may be used to form lenses from uncured formulations. Some preferred molds include two mold parts forming a front curve mold part and a back curve mold part.

Ophthalmic Lens or Lens: as used herein refers to any ophthalmic device that resides in or on the eye. These devices may provide optical correction or may be cosmetic. For example, the term lens may refer to a contact lens, intraocular lens, overlay lens, ocular insert, optical insert, or other similar device through which vision is corrected or modified, or through which eye physiology is cosmetically enhanced (e.g. iris color) without impeding vision. In some embodiments, the preferred lenses of the invention are soft contact lenses which are made from silicone elastomers or hydrogels, which include, for example, silicone hydrogels and fluorohydrogels.

Optical zone: as used herein refers to an area of an ophthalmic lens through which a wearer of the ophthalmic lens sees.

Power: as used herein refers to work done or energy transferred per unit of time.

Rechargeable or Reenergizable: as used herein refers to a capability of being restored to a state with a higher capacity to do work. Many uses within this invention may relate to the capability of being restored with the ability to flow electrical current at a certain rate for certain, reestablished time period.

Reenergize or Recharge: as used herein refers to the restoration of an energy source to a state with a higher capacity to do work. Many uses within this invention may relate to restoring a device to the capability to flow electrical current at a certain rate for a certain, reestablished time period.

Released from a mold: as used herein refers to a lens is either completely separated from the mold, or is only loosely attached so that it may be removed with mild agitation or pushed off with a swab.

Resting orientation: as used herein refers to the orientation of the molecules of a liquid crystal device in its resting, non-energized state.

Variable optic: as used herein refers to the capacity to change an optical quality, for example, the optical power of a lens or the polarizing angle.

Ophthalmic Lenses

Referring to FIG. 1, an apparatus 100 to form ophthalmic devices containing sealed and encapsulated inserts is depicted. The apparatus includes an exemplary front curve mold 102 and a matching back curve mold 101. A variable optic insert 104 and a body 103 of the ophthalmic device may be located inside the front curve mold 102 and the back curve mold 101. In some exemplary embodiments, the material of the body 103 may be a hydrogel material, and the variable optic insert 104 may be surrounded on all surfaces by this material.

The variable optic insert 104 may contain multiple liquid crystal layers 109 and 110. Other exemplary embodiments may include a single liquid crystal layer, some of which are discussed in later sections. The use of the apparatus 100 may create a novel ophthalmic device comprising a combination of components with numerous sealed regions.

In some exemplary embodiments, a lens with a variable optic insert 104 may include a rigid center soft skirt design wherein a central rigid optical element including the liquid crystal layers 109 and 110 is in direct contact with the atmosphere and the corneal surface on respective anterior and posterior surfaces. The soft skirt of lens material (typically a hydrogel material) is attached to a periphery of the rigid optical element, and the rigid optical element may also add energy and functionality to the resulting ophthalmic lens.

Figure 2A:
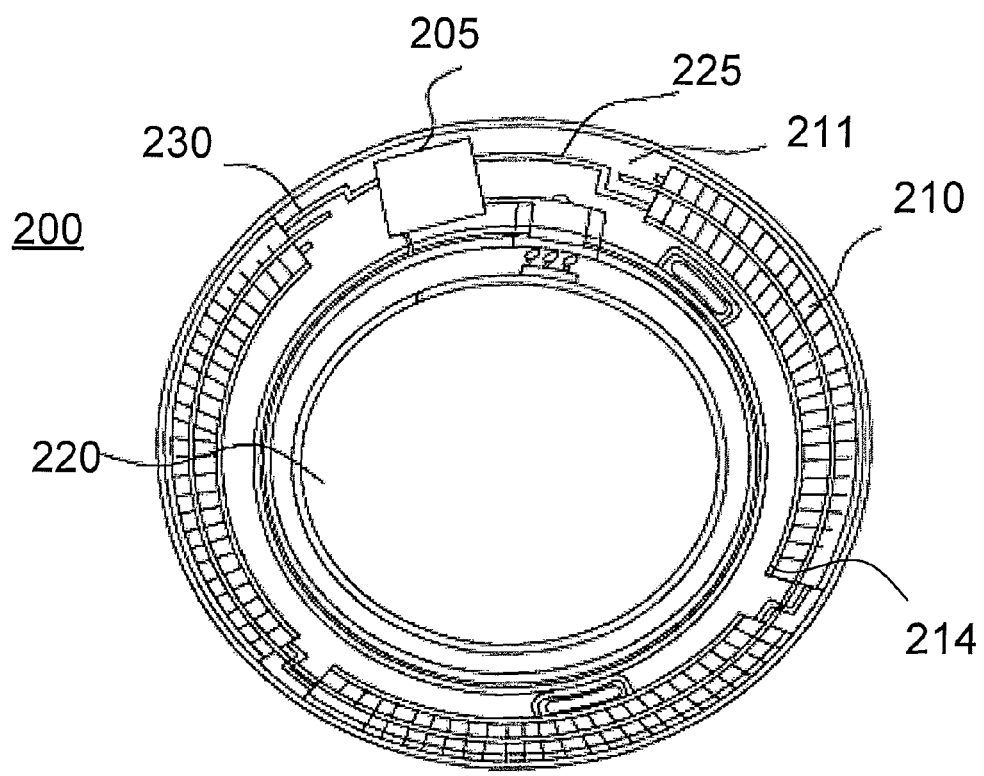
FIGS. 2A and 2B illustrates an exemplary energized ophthalmic lens with a variable optic insert embodiment.
Figure 2B:
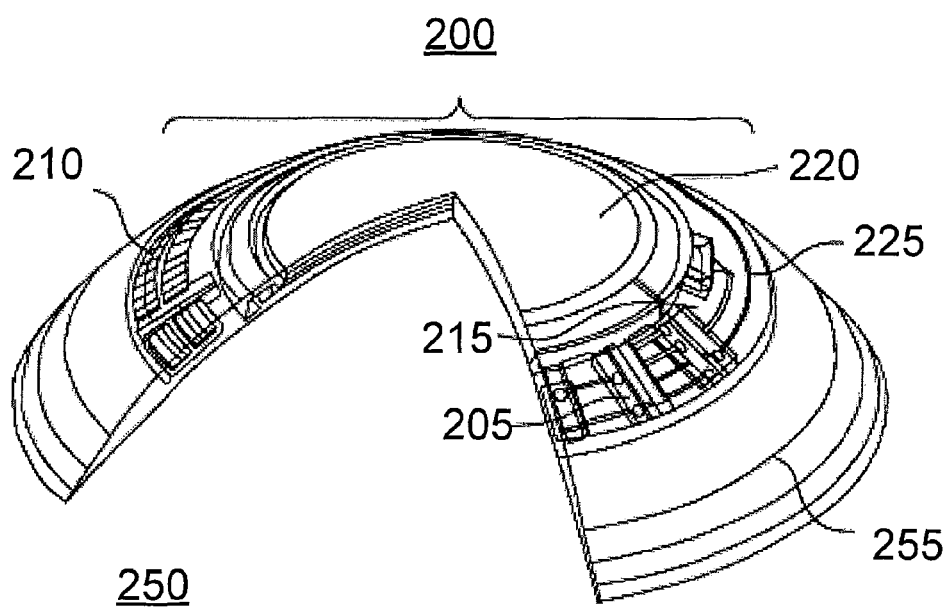

Referring to FIG. 2A, at 200 a top down and FIG. 2B at 250 a cross sectional depiction of an exemplary embodiment of a variable optic insert is shown. In this depiction, an energy source 210 is shown in a periphery portion 211 of the variable optic insert 200. The energy source 210 may include, for example, a thin film, rechargeable lithium ion battery or an alkaline cell based battery. The energy source 210 may be connected to interconnect features 214 to allow for interconnection. Additional interconnects at 225 and 230 for example may connect the energy source 210 to a circuit such as item 205. In other exemplary embodiments, an insert may have interconnect features deposited on its surface.

In some exemplary embodiments, the variable optic insert 200 may include a flexible substrate. This flexible substrate may be formed into a shape approximating a typical lens form in a similar manner previously discussed or by other means. However to add additional flexibility, the variable optic insert 200 may include additional shape features such as radial cuts along its length. There may be multiple electronic components, such as that indicated by 205, such as integrated circuits, discrete components, passive components and such devices that may also be included.

A variable optic portion 220 is also illustrated. The variable optic portion may be varied on command through the application of a current through the variable optic insert which in turn may typically vary an electric field established across a liquid crystal layer. In some exemplary embodiments, the variable optic portion 220 comprises a thin layer comprising liquid crystal between two layers of transparent substrate. There may be numerous manners of electrically activating and controlling the variable optic component, typically through action of the electronic circuit 205. The electronic circuit 205 may receive signals in various manners and may also connect to sensing elements which may also be in the insert such as item 215. In some exemplary embodiments, the variable optic insert may be encapsulated into a lens skirt 255, which may be comprised of hydrogel material or other suitable material to form an ophthalmic lens. In these exemplary embodiments the ophthalmic lens may be comprised of the ophthalmic skirt 255 and an encapsulated ophthalmic lens insert 200 which may itself comprise layers or regions of liquid crystal material or comprising liquid crystal material and in some exemplary embodiments the layers may comprise nano-scaled droplets of liquid crystal material.

A Variable Optic Insert Including Liquid Crystal Elements

Figure 3A:
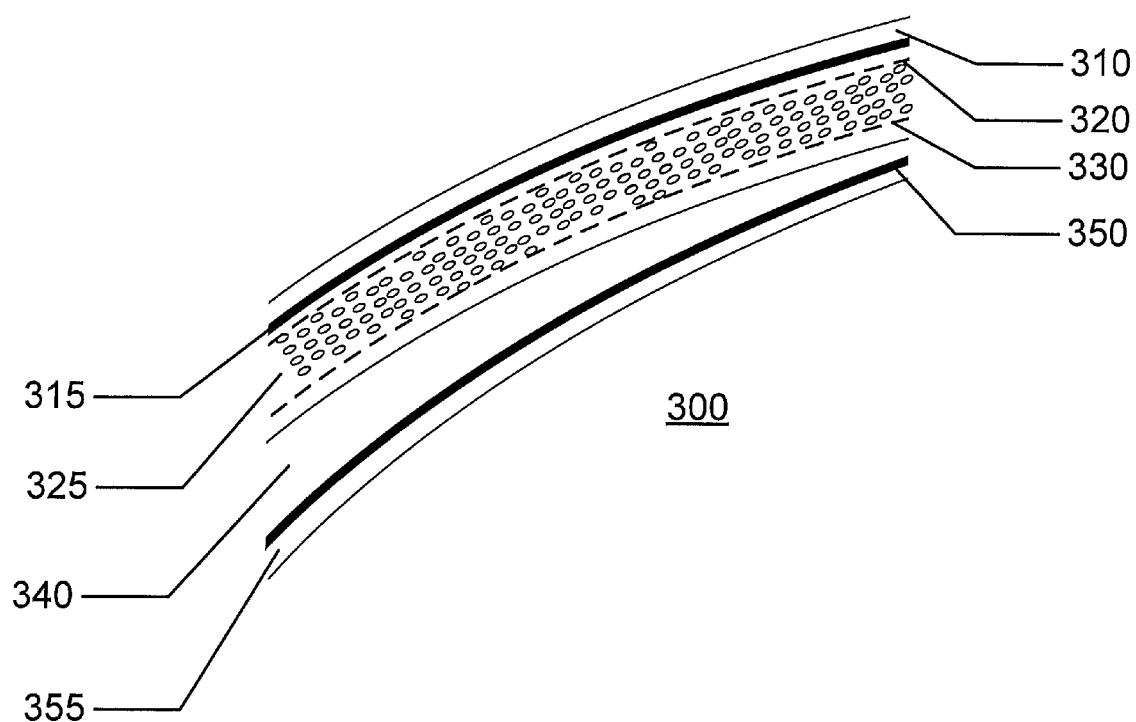
FIGS. 3A and 3B illustrate cross sectional views of a variable optic insert where the front and back curve pieces of the variable optic insert may have dielectric layers that vary across the variable optic portion.

Referring to FIG. 3A, a variable optic portion 300 that may be inserted into an ophthalmic lens is illustrated with a liquid crystal layer 325. The variable optic portion 300 may have a similar diversity of materials and structural relevance as has been discussed in other sections of this specification. In some exemplary embodiments, a transparent electrode 350 may be placed on a first transparent substrate 355. The first lens piece may include a dielectric layer 340. The layer may be comprised of a dielectric film, and in some exemplary embodiments, alignment layers may be placed upon the layer 340. In other exemplary embodiments the dielectric layers may be formed in such manners to have a dual function of an alignment layer. In exemplary embodiments comprising dielectric layers, the shape of the dielectric layer of the first lens surface 340 may form a regionally varied dielectric thickness as depicted. Such a regionally varied shape may introduce additional focusing power of the lens element above geometric effects of curved layers. In some exemplary embodiments, for example, the shaped dielectric layer may be formed by injection molding upon the first transparent electrode 350 first transparent substrate 355 combination.

In some exemplary embodiments the first transparent electrode 350 and a second transparent electrode 315 may be shaped in various manners. In some examples, the shaping may result in separate distinct regions being formed that may have energization applied separately. In other examples, the electrodes may be formed into patterns such as a helix from the center of the lens to the periphery which may apply a variable electric field across the liquid crystal layer 325. In either case, such electrode shaping may be performed in addition to the shaping of dielectric layer upon the electrode or instead of such shaping. The shaping of electrodes in these manners may also introduce additional focusing power of the lens element under operation.

The liquid crystal layer 325 may be located between the first transparent electrode 350 and a second transparent electrode 315. The second transparent electrode 315 may be attached to a second transparent substrate layer 310, wherein the device formed from the second transparent substrate layer 310 to the first transparent substrate layer 355 may contain the variable optic portion of the ophthalmic lens. Two alignment layers may also be located at 320 and 330 upon the dielectric layer and may surround the liquid crystal layer 325. The alignment layers at 320 and 330 may function to define a resting orientation of the ophthalmic lens. In some exemplary embodiments, the electrode layers 320 and 330 may be in electrical communication with liquid crystal layer 325 and cause a shift in orientation from the resting orientation to at least one energized orientation.

Figure 3B:
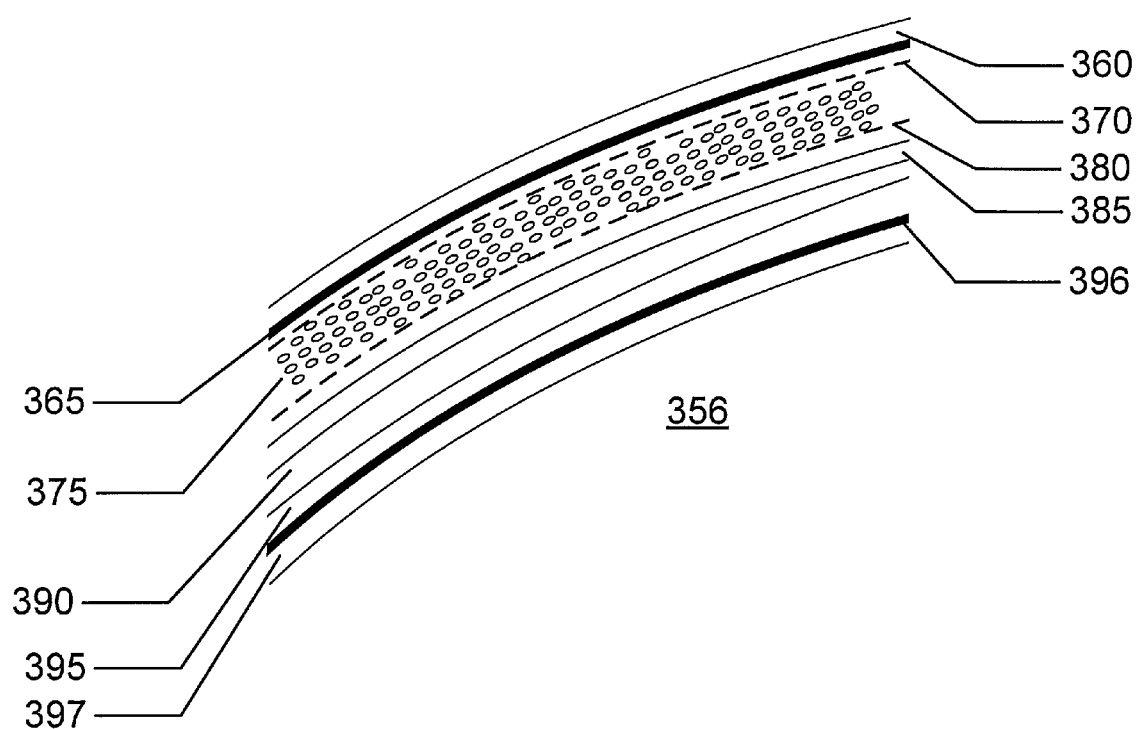

Referring to FIG. 3B, an alternative of a variable optic portion 356 which may be inserted into an ophthalmic lens is illustrated with a layer of nano-scaled droplets of liquid crystal 375. Similar to variable optic portion 300 in FIG. 3A, there may be layers of shaped dielectrics within the insert. For example, layers including 385,390 and 395 may form a composite shaped dielectric layer upon an exemplary first lens piece 397. The electrical effect of the dielectric layer may shape the effective electric field that is applied across the liquid crystal containing layer 375 when the insert is energized. A first transparent electrode 396 may be located on a first substrate layer or lens piece 397 and a second transparent electrode 365 on a second substrate layer 360. In some exemplary embodiments alignment layers 380 and 370 may also be located around the liquid crystal layer 375 and influence the alignment of molecules therein.

Insert 356 (which may also be called Variable optic portion 356) may be depicted with multiple dielectric layers at 385, 390 and 395. In some embodiments one type of dielectric material may comprise layers 385 and 395 while a different type of material may comprise layer 390. In some exemplary embodiments, such a relatively complex structure may allow for the combination of dielectric materials that have a different effective dielectric strength at different frequencies. For example, layers 385 and 395 may be comprised of silicon dioxide in a non-limiting sense while the material at layer 390 may be an aqueous solution. At optical frequencies these layers may be formed in such a manner that the effect on a light beam may be similar for all layers. Yet, at lower electrical frequencies as may be applied to the electrodes 365 and 396 the aqueous layer 390 may have a different dielectric property than the other layers allowing for enhanced effects on the regional shaping of the dielectric field that may be operant across the liquid crystal layer 375.

The variable optic portion 356 may include a median substrate layer 385 that may form a surface layer upon which the liquid crystal layer 375 may be deposited. In some embodiments, the median substrate layer 385 may also act to contain the second lens element 390 if said second lens element is in liquid form. Some embodiments may include a liquid crystal layer 375 located between a first alignment layer 360 and a second alignment layer 370 wherein the second alignment layer 370 is placed upon a second transparent electrode 365. A top substrate layer 360 may contain the combination of layers that form the variable optic portion 356, which may respond to electrical fields applied across its electrodes 365 and 396. The alignment layers 370 and 380 may affect the optical characteristics of the variable optic portion 356 by various means.

Figure 4A:
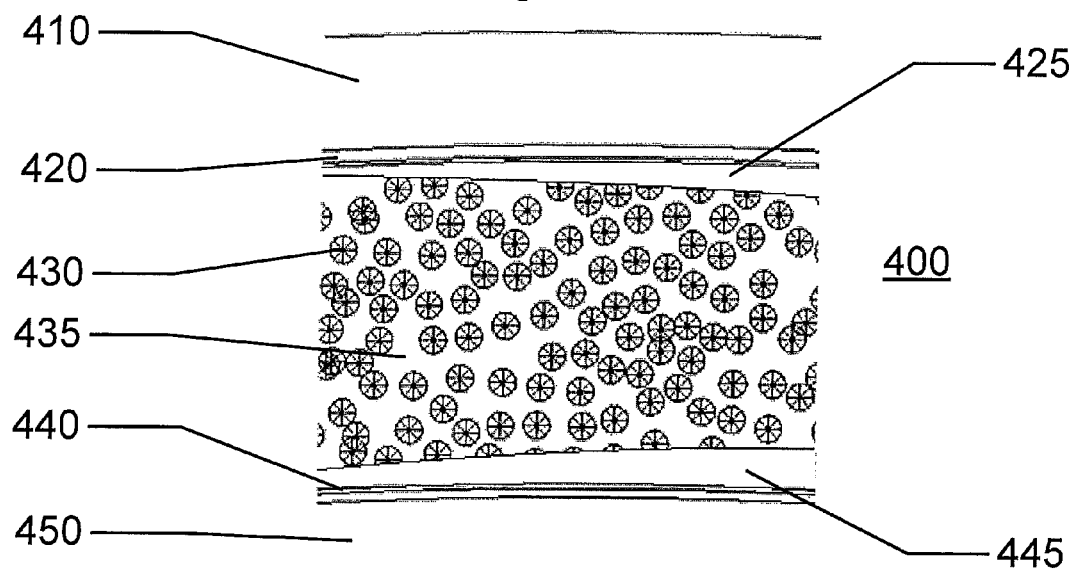
FIGS. 4A and 4B illustrate a cross sectional view of an ophthalmic lens device embodiment with a variable optic insert wherein the variable optic portion may be comprised of nano-scaled droplets of liquid crystal.
Figure 4B:
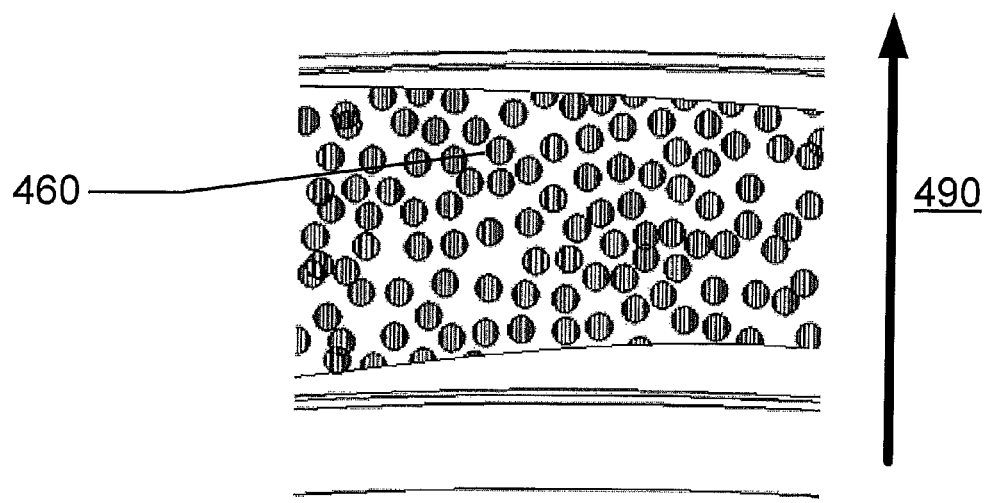

Liquid Crystal Devices Comprising Layers of Nano-Scale Polymer Dispersed Liquid Crystal Droplets Referring to FIGS. 4A and 4B, a variable optic portion, FIG. 4A, that may be inserted into an ophthalmic lens is illustrated with a polymer layer 435 and nano-scale polymer dispersed liquid crystal droplets. The droplets are illustrated at numerous locations in a broad exemplary manner, one of which may be depicted at example 430. The polymerized regions may give the film structural definition and shape while the droplets, such as 430, rich in liquid crystal material may have a significant optical effect on light transmitting through the layer.

The nano-sized droplets are useful in that they are small enough in dimension that the altered refractive index between the droplets and neighboring layers both in energized and non-energized states may not be significant in terms of scattering processes. Also, as importantly, their contribution in the effective value of the refractive index of the material generally may be independent on polarization of the light beam. Technologically, the material also has an advantage compared to most liquid crystal based devices that it does not require alignment layers at the boundaries of the molds and pre-aligning procedures.

The confinement of the liquid crystals to nano-sized droplets may make it more difficult for molecules to rotate within the droplet. This effect may result in larger electric fields being used to align the liquid crystal molecules into an energized state. As well, the engineering of the chemical structures of the liquid crystal molecules may also help to define conditions that allow for lower electrical fields being required for establishing aligned states.

There may be numerous manners to form a polymer dispersed liquid crystal layer of the type illustrated at 400. In a first example, a mixture of a monomer and a liquid crystal molecule may be formed with the combination being heated to form an homogenous mixture. Next, the mixture may be applied to a front curve insert piece 410 and then encapsulated in the lens insert by the addition of a back curve or intermediate insert curve piece 450. The insert containing the liquid crystal mixture may then be cooled at a controlled and predetermined rate. As the mixture cools, regions of relatively pure liquid crystal monomer may precipitate as droplets or droplets within the layer. A subsequent processing step to catalyze polymerization of the monomer may then be performed. In some examples, actinic radiation may be shown on the mixture to initiate polymerization.

In another example, a mixture of liquid crystal and liquid crystal monomer may also be performed. In this example, the mixture may be applied to a front curve piece 410 or back curve or intermediate insert curve piece 450 and then the additional piece may be applied. The applied mixture may already contain components to trigger the polymerization reactions. Alternately, actinic radiation may be shown upon the mixture to initiate polymerization. With certain material choices for the monomer and initiating agents, the polymerization reaction may proceed at a rate and in such a manner that high concentration regions of liquid crystal monomer that are similar to droplets or droplets within the polymerized network of material may be formed. These droplets may be surrounded by polymerized material that also contains an amount of liquid crystal molecules. These liquid crystal molecules may be free to move within the polymer matrix before it is fully polymerized and may also be able to feel orienting effects in their neighboring regions which may be other liquid crystal molecules or alignment features on the surfaces of the insert pieces that the liquid crystal mixture was applied to. The alignment regions, if there are any, may determine a resting state for the liquid crystal molecules within the polymer matrix and may determine a fixed orientation of the liquid crystal molecules in the polymerized regions after significant polymerization has occurred. As well, the aligned liquid crystal molecules in the polymer may also exert an orienting effect on the liquid crystal molecules within droplets of liquid crystal molecules. Thus, the layer of combined polymerized regions and included droplet regions may exist in a natural alignment state predetermined by the inclusion of alignment features upon the insert pieces before the insert is formed with the liquid crystal intermediate layer.

The nano-scaled droplets of liquid crystal may also be formed without the ability to be aligned by alignment layers.

This may be because no alignment layers are formed or because the nano-scaled droplets are remote enough from alignment layers or from molecules capable of passing on alignment effects of the alignment layers. As may be seen in the depiction at 430 of FIG. 4A, the orientation of the liquid crystal molecules may be random in the absence of alignment layers or aligning forces upon the molecules.

There may be numerous manners to incorporate liquid crystal molecules into the polymerized or gelled regions. In the previous descriptions some manners have been described. Nevertheless, any method of creating polymer dispersed liquid crystal layers may comprise art within the scope of the present invention and may be used to create an ophthalmic device. The previous examples mentioned the use of monomers to create polymerized layers that surround droplets of liquid crystal molecules. The state of the polymerized monomers may be a crystalline form, a semicrystalline form or an amorphous form of polymerized material or in other exemplary embodiments may also exist as a gelled form or semi-gelled form of polymerized monomer.

The variable optic portion in FIG. 4A may have other aspects that may be defined by a similar diversity of materials and structural relevance as has been discussed in other sections of this specification. In some exemplary embodiments, a first transparent electrode 420 may be placed on the first transparent substrate 410. The first lens surface may be comprised of a dielectric film, and in some exemplary embodiments, alignment layers which may be placed upon the first transparent electrode 420. In such embodiments, the shape of the dielectric layer of the first lens surface 425 may form a regionally varied shape in the dielectric thickness. A dielectric layer 445 on a second lens surface at the back curve or intermediate insert curve piece 450 may also be formed to comprise a varied shape in dielectric thickness. Such regionally varied shape may introduce additional focusing power of the lens element as discussed in reference to FIGS. 3A and 3B. In some embodiments, for example, the shaped layer may be formed by injection molding upon the first transparent electrode 420 first transparent substrate 410 combination.

In some exemplary embodiments the first transparent electrode 420 and a second transparent electrode 440 may be shaped in various manners. In some examples, the shaping may result in separate and distinct regions being formed that may have energization applied separately. In other examples, the electrodes may be formed into patterns such as a helix from the center of the lens to the periphery which may apply a variable electric field across the liquid crystal layer 430 and 435. In either case, such electrode shaping may be performed in addition to the shaping of dielectric layers upon the electrode or instead of such shaping. The shaping of electrodes in these manners may also introduce additional focusing power of the lens element under operation.

The polymer dispersed liquid crystal layer 430 and 435 may be located between the first transparent electrode 420 and a second transparent electrode 440. The second transparent electrode 440 may be attached to the back curve or intermediate insert curve piece 450, wherein the device formed from the first transparent substrate 410 to the back curve or intermediate insert curve piece 450 may comprise the variable optic portion of the ophthalmic lens. Two alignment layers may also be located upon the dielectric layer and may surround the liquid crystal layer 430 and 435. The alignment layers may function to define a resting orientation of the ophthalmic lens. In some exemplary embodiments, the electrode layers 420 and 440 may be in electrical communication with liquid crystal layer 430, 435 and cause a shift in orientation from the resting orientation to at least one energized orientation.

In FIG. 4B, the effect of energizing of the electrode layers is depicted. The energizing may cause an electric field to be established across the device as illustrated at 490. The electric field may induce the liquid crystal molecules to realign themselves with the formed electric field. As depicted at 460 in the droplets containing liquid crystal, molecules may realign, as depicted by the now vertical lines.

Figure 5:
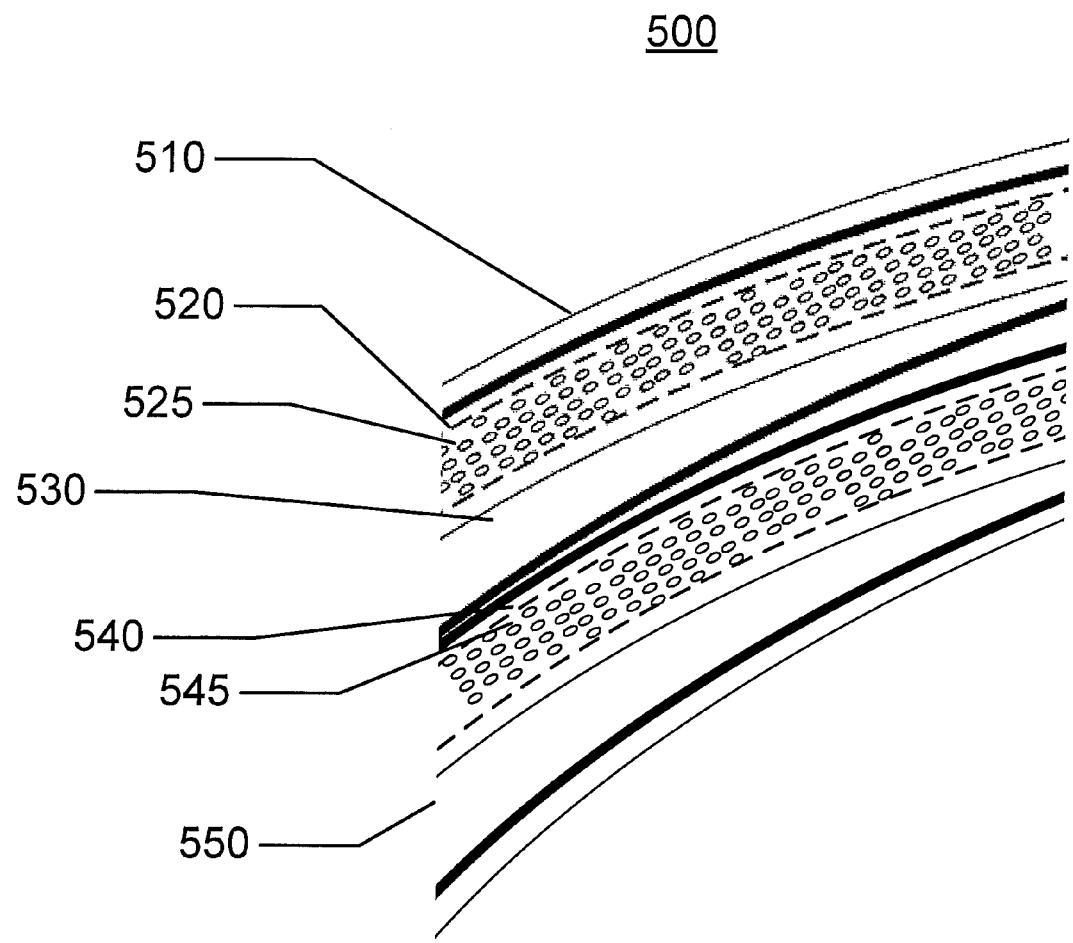
FIG. 5 illustrates an exemplary embodiment or a variable optic insert wherein the variable optic portion may be comprised of nano-scaled droplets of liquid crystal.

Referring to FIG. 5, an alternative of a variable optic insert 500 that may be inserted into an ophthalmic lens is illustrated with two liquid crystal layers 525 and 545. Each of the aspects of the various layers around the liquid crystal region may have similar diversity as described in relation to the variable optic insert 300 in FIG. 3A. In some exemplary embodiments, the alignment layers may introduce polarization sensitivity into the function of a single liquid crystal element. By combining a first liquid crystal based element formed by a first substrate 510, whose intervening layers in the space around 520 and a second substrate 530 may have a first polarization preference, with a second liquid crystal based element formed by a second surface on the second substrate 530, the intervening layers in the space around 540 and a third substrate 550 with a second polarization preference, a combination may be formed which may allow for an electrically variable focal characteristic of a lens that is not sensitive to the polarization aspects of incident light upon it.

At the exemplary element 500, a combination of two electrically active liquid crystal layers of the various types and diversity associated with the example at 300 may be formed utilizing three substrate layers. In other examples, the device may be formed by the combination of four different substrates. In some examples, the intermediate substrate 530 may be split into two layers. If the substrates are combined at a later time, a device that functions similarly to item 500 may result. The combination of four layers may present an example for the manufacturing of the element where similar devices may be constructed around both 525 and 545 liquid crystal layers where the processing difference may relate to the portion of steps that define alignment features for the liquid crystal element. In still further examples, if the lens element around a single liquid crystal layer such that depicted at 300 is spherically symmetric or symmetric upon a rotation of ninety degrees, then two pieces may be assembled into a structure of the type depicted at 500 by rotating the two pieces ninety degrees relative to each other before assembling.

Figure 6:
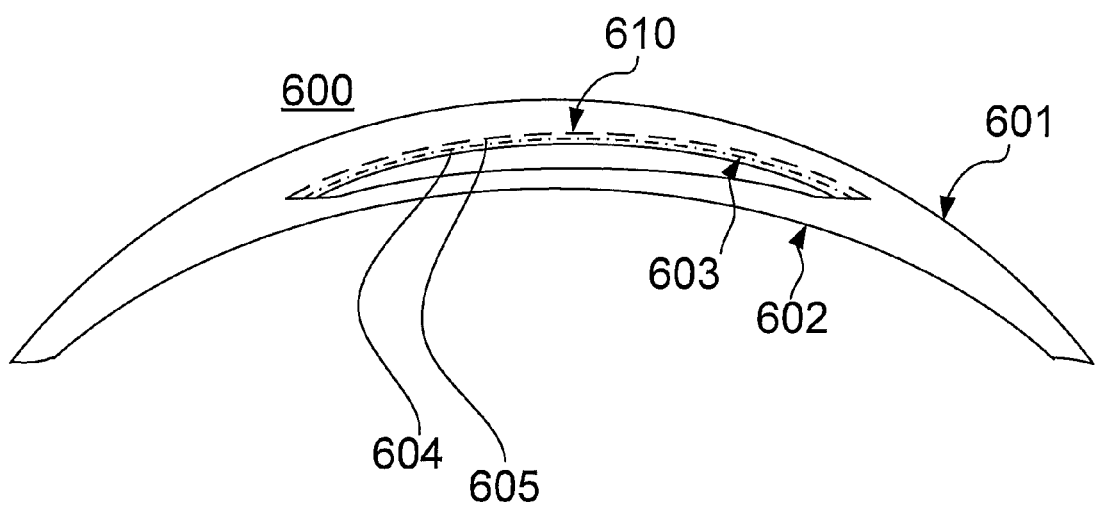
FIG. 6 illustrates an alternative embodiment of a variable optic lens comprising an insert wherein the variable optic portions may be comprised of nano-scaled droplets of liquid crystal.

Referring to FIG. 6, an ophthalmic lens 600 is shown with an embedded variable optic insert 610. The ophthalmic lens 600 may have a front curve surface 601 and a back curve surface 602. The insert 610 may have a variable optic portion 603 with a liquid crystal layer 605. In some exemplary embodiments, the insert 610 may have multiple liquid crystal layers 604 and 605. Portions of the insert 610 may overlap with the optical zone of the ophthalmic lens 600.

Materials

Microinjection molding embodiments may include, for example, a poly(4-methylpent-1-ene) copolymer resin are used to form lenses with a diameter of between about 6 mm to 10 mm and a front surface radius of between about 6 mm and 10 mm and a rear surface radius of between about 6 mm and 10 mm and a center thickness of between about 0.050 mm and 1.0 mm. Some exemplary embodiments include an insert with diameter of about 8.9 mm and a front surface radius of about 7.9 mm and a rear surface radius of about 7.8 mm and a center thickness of about 0.200 mm and an edge thickness of about 0.050 mm.

The variable optic insert 104 may be placed in a mold part 101 and 102 utilized to form an ophthalmic lens as illustrated in FIG. 1. Mold part 101 and 102 material may include, for example, a polyolefin of one or more of: polypropylene, polystyrene, polyethylene, polymethyl methacrylate, and modified polyolefins. Other molds may include a ceramic or metallic material.

A preferred alicyclic co-polymer contains two different alicyclic polymers. Various grades of alicyclic co-polymers may have glass transition temperatures ranging from 105° C. to 160° C.

In some exemplary embodiments, the molds of the present invention may comprise polymers such as polypropylene, polyethylene, polystyrene, polymethyl methacrylate, modified polyolefins containing an alicyclic moiety in the main chain and cyclic polyolefins. This blend may be used on either or both mold halves, where it is preferred that this blend is used on the back curve and the front curve consists of the alicyclic co-polymers.

In some preferred methods of making molds 100 according to the present invention, injection molding is utilized according to known techniques; however, exemplary embodiments may also include molds fashioned by other techniques including, for example: lathing, diamond turning, or laser cutting.

Typically, lenses are formed on at least one surface of both mold parts 101 and 102. However, in some exemplary embodiments, one surface of a lens may be formed from a mold part 101 or 102 and another surface of a lens may be formed using a lathing method, or other methods.

In some exemplary embodiments, a preferred lens material includes a silicone containing component. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some exemplary embodiments, the ophthalmic lens skirt, also called an insert-encapsulating layer, that surrounds the insert may be comprised of standard hydrogel ophthalmic lens formulations. Exemplary materials with characteristics that may provide an acceptable match to numerous insert materials may include the Narafilcon family (including Narafilcon A and Narafilcon B), and the Etafilcon family (including Etafilcon A). A more technically inclusive discussion follows on the nature of materials consistent with the art herein. One ordinarily skilled in the art may recognize that other material other than those discussed may also form an acceptable enclosure or partial enclosure of the sealed and encapsulated inserts and should be considered consistent and included within the scope of the claims.

Suitable silicone containing components include compounds of Formula I

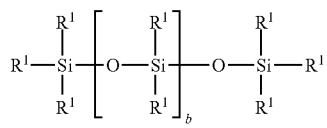

where $R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some embodiments between one and 3 $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl (meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one exemplary embodiment the free radical reactive groups comprises (meth)acrylate, acryloxy, (meth) acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one exemplary embodiment, b is zero, one $R^1$ is a monovalent reactive group, and at least 3 $R^1$ are selected from monovalent alkyl groups having one to 16 carbon atoms, and in another embodiment from monovalent alkyl groups having one to 6 carbon atoms. Non-limiting examples of silicone components of this embodiment include 2-methyl-2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another exemplary embodiment, b is 2 to 20, 3 to 15 or in some exemplary embodiments 3 to 10; at least one terminal $R^1$ comprises a monovalent reactive group and the remaining $R^1$ are selected from monovalent alkyl groups having 1 to 16 carbon atoms, and in another exemplary embodiment from monovalent alkyl groups having 1 to 6 carbon atoms. In yet another exemplary embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another exemplary embodiment, b is 5 to 400 or from 10 to 300, both terminal $R^1$ comprise monovalent reactive groups and the remaining $R^1$ are independently selected from monovalent alkyl groups having 1 to 18 carbon atoms, which may have ether linkages between carbon atoms and may further comprise halogen.

In one exemplary embodiment, where a silicone hydrogel lens is desired, the lens of the present invention will be made from a reactive mixture comprising at least about 20 and preferably between about 20 and 70% wt silicone containing components based on total weight of reactive monomer components from which the polymer is made.

In another exemplary embodiment, one to four $R^1$ comprises a vinyl carbonate or carbamate of the formula:

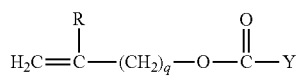

Formula II wherein: Y denotes —O—, —S— or —NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio)propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and

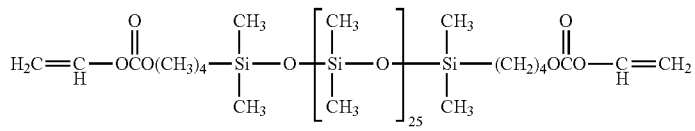

Where biomedical devices with modulus below about 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

$(*D*A*D*G)_a*D*D*E^1$;

$E(*D*G*D*A)_a*D*G*D*E^1$ or;

$E(*D*A*D*G)_a*D*A*D*E^1$     Formulae IV-VI wherein:
D denotes an alkyl diradical, an alkyl cycloalkyl diradical, a cycloalkyl diradical, an aryl diradical or an alkylaryl diradical having 6 to 30 carbon atoms,
G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

$a$ is at least 1;

A denotes a divalent polymeric radical of formula:

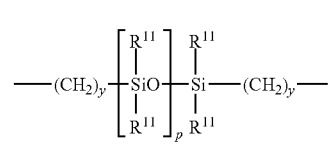

Formula VII $R^{11}$ independently denotes an alkyl or fluoro-substituted alkyl group having 1 to 10 carbon atoms, which may contain ether linkages between carbon atoms; y is at least 1; and p provides a moiety weight of 400 to 10,000; each of E and $E^1$ independently denotes a polymerizable unsaturated organic radical represented by formula:

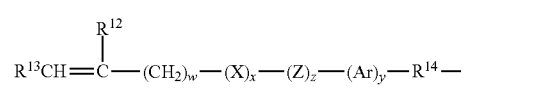

Formula VIII wherein: $R^{12}$ is hydrogen or methyl; $R^{13}$ is hydrogen, an alkyl radical having 1 to 6 carbon atoms, or a —CO—Y—R radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

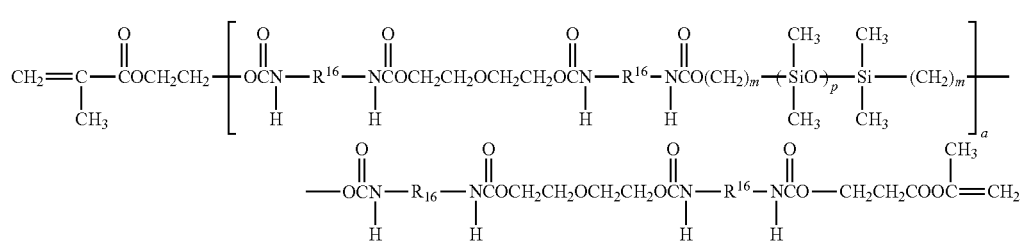

Formula IX wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

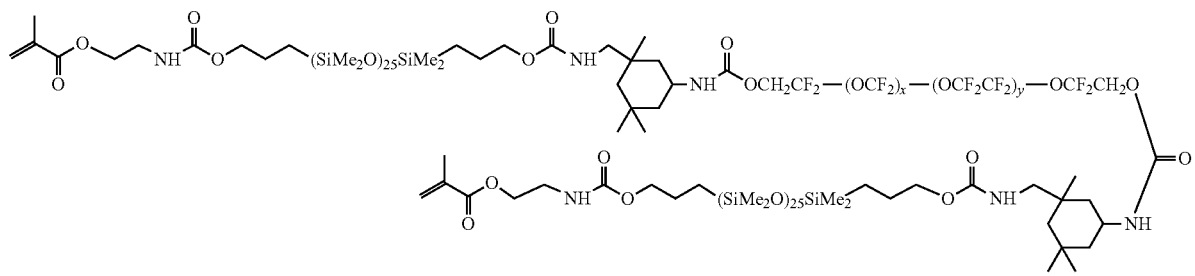

Formula X

Other silicone containing components suitable for use in the present invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and cross-linkable monomers containing polyether and polysiloxanyl groups. Any of the foregoing polysiloxanes may also be used as the silicone containing component in the present invention.

Liquid Crystal Materials

There may be numerous materials that may have characteristics consistent with the liquid crystal layer types that have been discussed herein. It may be expected that liquid crystal materials with favorable toxicity may be preferred and naturally derived cholesteryl based liquid crystal materials may be useful. In other examples, the encapsulation technology and materials of ophthalmic inserts may allow a broad choice of materials that may include the LCD display related materials which may typically be of the broad categories related to nematic or cholesteric N or smectic liquid crystals or liquid crystal mixtures. Commercially available mixtures such as Merck Specialty chemicals Licristal mixtures for TN, VA, PSVA, IPS and FFS applications and other commercially available mixtures may form a material choice to form a liquid crystal layer.

In a non-limiting sense, mixtures or formulations may contain the following liquid crystal materials: 1-(trans-4-Hexylcyclohexyl)-4-isothiocyanatobenzene liquid crystal, benzoic acid compounds including (4-Octylbenzoic acid and 4-Hexylbenzoic acid), carbonitrile compounds including (4'-Pentyl-4-biphenylcarbonitrile, 4'-Octyl-4-biphenylcarbonitrile, 4'-(Octyloxy)-4-biphenylcarbonitrile, 4'-(Hexyloxy)-4-biphenylcarbonitrile, 4-(trans-4-Pentylcyclohexyl)benzonitrile, 4'-(Pentyloxy)-4-biphenylcarbonitrile, 4'-Hexyl-4-biphenylcarbonitrile), and 4,4'-Azoxyanisole.

In a non-limiting sense, formulations showing particularly high birefringence of $n_{par}-n_{pep}>0.3$ at room temperature may be used as a liquid crystal layer forming material. For example, such formulation referred to as W1825 may be as available from AWAT and BEAM Engineering for Advanced Measurements Co. (BEAMCO).

There may be other classes of liquid crystal materials that may be useful for the inventive concepts here. For example, ferroelectric liquid crystals may provide function for electric field oriented liquid crystal embodiments, but may also introduce other effects such as magnetic field interactions. Interactions of electromagnetic radiation with the materials may also differ.

Alignment Layer Materials

In many of the exemplary embodiments that have been described, the liquid crystal layers within ophthalmic lenses may need to be aligned in various manners at insert boundaries. The alignment, for example, may be parallel or perpendicular to the boundaries of the inserts, and this alignment may be obtained by proper processing of the various surfaces. The processing may involve coating the substrates of the inserts that contain the liquid crystal (LC) by alignment layers. Those alignment layers are described herein.

A technique commonly practiced in liquid crystal based devices of various types may be the rubbing technique. This technique may be adapted to account for the curved surfaces such as the ones of the insert pieces used for enclosing the liquid crystal. In an example, the surfaces may be coated by a Polyvinyl Alcohol (PVA) layer. For example, a PVA layer may be spin coated using a 1 wt. % aqueous solution. The solution may be applied with spin coating at 1000 rpm for time such as approximately 60 s, and then dried. Subsequently, the dried layer may then be rubbed by a soft cloth. In a non-limiting example, the soft cloth may be velvet.

Photo-alignment may be another technique for producing alignment layers upon liquid crystal enclosures. In some exemplary embodiments, photo-alignment may be desirable due to its non-contact nature and the capability of large scale fabrication. In a non-limiting example, the photo-alignment layer used in the liquid crystal variable optic portion may be comprised of a dichroic azobenzene dye (azo dye) capable of aligning predominantly in the direction perpendicular to the polarization of linear polarized light of typically UV wavelengths. Such alignment can be a result of repetitive trans-cis-trans photoisomerization processes.

As an example, PAAD series azobenzene dyes may be spin coated from a 1 wt. % solution in DMF at 3000 rpm for 30 s. Subsequently, the obtained layer may be exposed to a linear polarized light beam of a UV wavelength (for example 325 nm, 351 nm, 365 nm) or even a visible wavelength (400-500 nm). The source of the light may take various forms. In some exemplary embodiments, light may originate from laser sources for example. Other light sources such as LEDs, halogen and incandescent sources may be other non-limiting examples. Either before or after the various forms of light are polarized in the various patterns as appropriate, the light may be collimated in various manners such as through the use of optical lensing devices. Light from a laser source may inherently have a degree of collimation, for example.

A large variety of photoanisotropic materials are known currently, based on azobenzene, polyesthers, photo-crosslinkable polymer liquid crystals with mesogenic 4-(4-methoxycinnamoyloxy)biphenyl side groups and the like. Examples of such materials include sulfonic bisazodye SD1 and other azobenzene dyes, particularly, PAAD-series materials available from BEAM Engineering for Advanced Measurements Co. (BEAMCO), Poly(vinyl cinnamates), and others.

In some exemplary embodiments, it may be desirable to use water or alcohol solutions of PAAD series azo dyes. Some azobenzene dyes, for example, Methyl Red, may be used for photoalignment by directly doping a liquid crystal layer. Exposure of the azobenzene dye to a polarized light may cause diffusion and adhesion of the azo dyes to and within the bulk of the liquid crystal layer to the boundary layers creating desired alignment conditions.

Azobenzene dyes such as Methyl Red may also be used in combination with a polymer, for example, PVA. Other photoanisotropic materials capable of enforcing alignment of adjacent layers of liquid crystals may be acceptable are known currently. These examples may include materials based on coumarines, polyesthers, photo-crosslinkable polymer liquid crystals with mesogenic 4-(4-methoxycinnamoyloxy)-biphenyl side groups, poly(vinyl cinnamates), and others. The photo-alignment technology may be advantageous for embodiments comprising patterned orientation of liquid crystal.

In another exemplary embodiment of producing alignment layers, the alignment layer may be obtained by vacuum deposition of silicon oxide on the insert piece substrates. For example, $SiO_2$ may be deposited at low pressure such as $\sim 10^{-6}$ mbar. It may be possible to provide alignment features at a nanoscaled size that are injection molded into with the creation of the front and back insert pieces. These molded features may be coated in various manners with the materials that have been mentioned or other materials that may directly interact with physical alignment features and transmit the alignment patterning into alignment orientation of liquid crystal molecules.

Ion beam alignment may be another technique for producing alignment layers upon liquid crystal enclosures. In some exemplary embodiments, collimated argon ion or focused gallium ion beam may be bombarded upon the alignment layer at a defined angle/orientation. This type of alignment may also be used to align silicon oxide, diamond-like-carbon (DLC), polyimide and other alignment materials.

Still further exemplary embodiments may relate to the creation of physical alignment features to the insert pieces after they are formed. Rubbing techniques as are common in other liquid crystal based art may be performed upon the molded surfaces to create physical grooves. The surfaces may also be subjected to a post molding embossing process to create small grooved features upon them. Still further exemplary embodiments may derive from the use of etching techniques which may involve optical patterning processes of various kinds.

Dielectric Materials

Dielectric films and dielectrics are described herein. By way of non-limiting examples, the dielectric film or dielectrics used in the liquid crystal variable optic portion possess characteristics appropriate to the invention described herein. A dielectric may comprise one or more material layers functioning alone or together as a dielectric. Multiple layers may be used to achieve dielectric performance superior to that of a single dielectric.

The dielectric may permit a defect-free insulating layer at a thickness desired for the discretely variable optic portion, for example, between 1 and 10 µm. A defect may be referred to as a pinhole, as is known by those skilled in the art to be a hole in the dielectric permitting electrical and/or chemical contact through the dielectric. The dielectric, at a given thickness, may meet requirements for breakdown voltage, for example, that the dielectric should withstand 100 volts or more.

The dielectric may allow for fabrication onto curved, conical, spherical, and complex three-dimensional surfaces (e.g., curved surfaces or non-planar surfaces). Typical methods of dip- and spin-coating may be used, or other methods may be employed.

The dielectric may resist damage from chemicals in the variable optic portion, for example the liquid crystal or liquid crystal mixture, solvents, acids, and bases or other materials that may be present in the formation of the liquid crystal region. The dielectric may resist damage from infrared, ultraviolet, and visible light. Undesirable damage may include degradation to parameters described herein, for example, breakdown voltage and optical transmission. The dielectric may resist permeation of ions. The dielectric may adhere to an underlying electrode and/or substrate, for example, with the use of an adhesion promotion layer. The dielectric may be fabricated using a process which allows for low contamination, low surface defects, conformal coating, and low surface roughness.

The dielectric may possess relative permittivity or a dielectric constant which is compatible with electrical operation of the system, for example, a low relative permittivity to reduce capacitance for a given electrode area. The dielectric may possess high resistivity, thereby permitting a very small current to flow even with high applied voltage. The dielectric may possess qualities desired for an optic device, for example, high transmission, low dispersion, and refractive index within a certain range. Example, non-limiting, dielectric materials, include one or more of Parylene-C, Parylene-HT, Silicon Dioxide, Silicon Nitride, and Teflon AF.

Electrode Materials

Electrodes are described herein for applying an electric potential for achieving an electric field across the liquid crystal region. An electrode generally comprises one or more material layers functioning alone or together as an electrode.

The electrode may adhere to an underlying substrate, dielectric coating, or other objects in the system, perhaps with the use of an adhesion promoter (e.g., methacryloxypropyltrimethoxysilane). The electrode may form a beneficial native oxide or be processed to create a beneficial oxide layer. The electrode may be transparent, substantially transparent or opaque, with high optical transmission and little reflection. The electrode may be patterned or etched with known processing methods. For example, the electrodes may be evaporated, sputtered, or electroplated, using photolithographic patterning and/or lift-off processes.

The electrode may be designed to have suitable resistivity for use in the electrical system described herein, for example, meeting the requirements for resistance in a given geometric construct.

The electrodes may be manufactured from one or more of indium tin oxide (ITO), aluminum doped zinc oxide (AZO), gold, stainless steel, chrome, graphene, graphene doped layers and aluminum. It will be appreciated that this is not an exhaustive list.

Processes

The following method steps are provided as examples of processes that may be implemented according to some aspects of the present invention. It should be understood that the order in which the method steps are presented is not meant to be limiting and other orders may be used to implement the invention. In addition, not all of the steps are required to implement the present invention and additional steps may be included in various embodiments of the present invention. It may be obvious to one skilled in the art that additional embodiments may be practical, and such methods are well within the scope of the claims.

Figure 7:
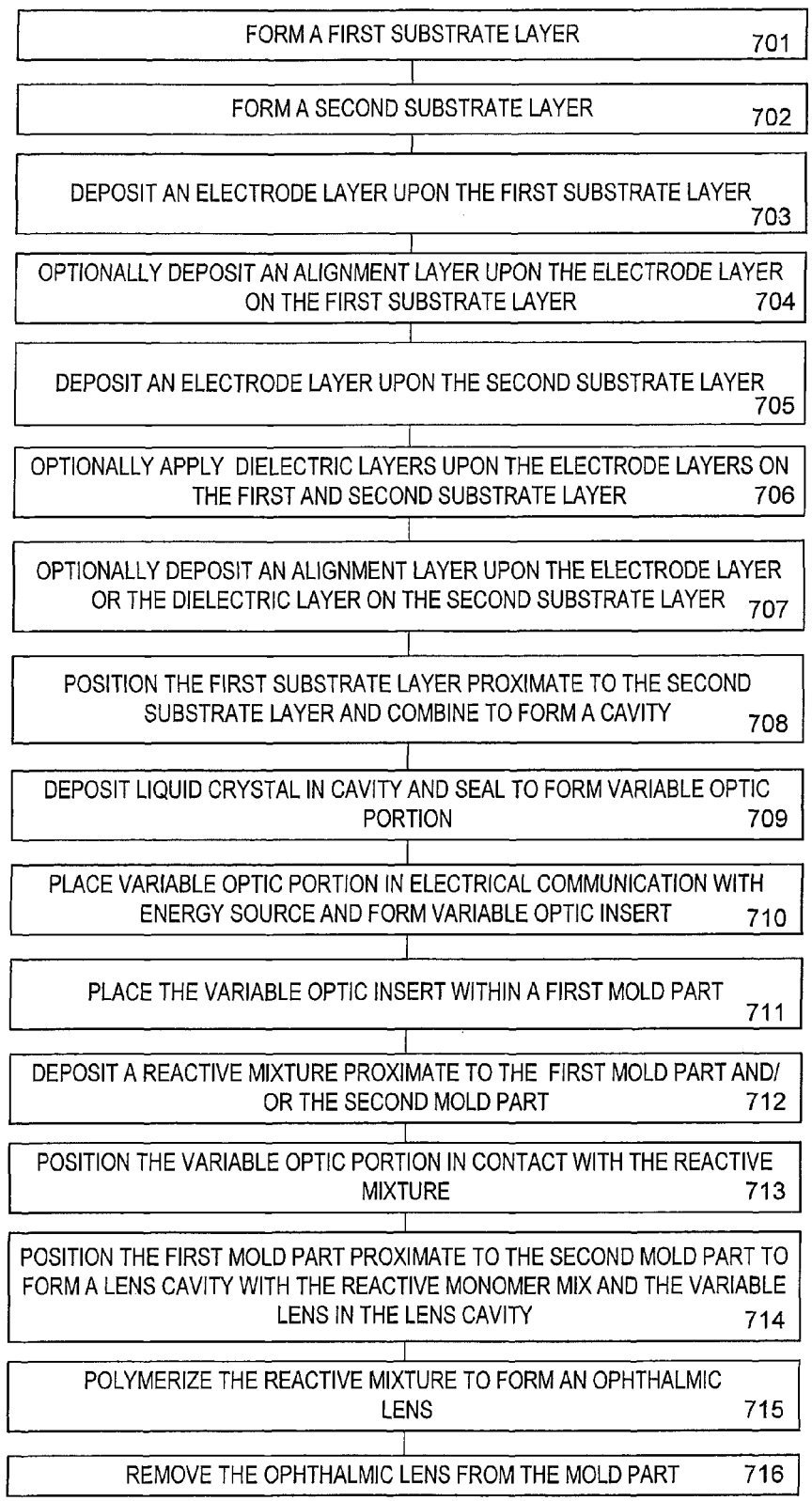
FIG. 7 illustrates method steps for forming an ophthalmic lens with a variable optic insert which may be comprised of nano-scaled droplets of liquid crystal.

Referring to FIG. 7, a flowchart illustrates exemplary steps that may be used to implement the present invention. At 701, forming a first substrate layer which may comprise a back curve surface and have a top surface with a shape of a first type that may differ from the shape of surface of other substrate layers. In some exemplary embodiments, the difference may include a different radius of curvature of the surface at least in a portion that may reside in the optical zone. At 702, forming a second substrate layer which may comprise a front curve surface or an intermediate surface or a portion of an intermediate surface for more complicated devices. At 703, an electrode layer may be deposited upon the first substrate layer. The deposition may occur, for example, by vapor deposition or electroplating. In some exemplary embodiments, the first substrate layer may be part of an insert that has regions both in the optical zone and regions in the non-optic zone. The electrode deposition process may simultaneously define interconnect features in some embodiments. In some exemplary embodiments a dielectric layer may be formed upon the interconnects or electrodes. The dielectric layer may comprise numerous insulating and dielectric layers, for example silicon dioxide.

At 704, the first substrate layer may be further processed to add an alignment layer upon the previously deposited electrode layer. The alignment layers may be deposited upon the top layer on the substrate and then processed in standard manners, for example, rubbing techniques, to create the grooving features that are characteristic of standard alignment layers or by treatment with exposure to energetic particles or light. Thin layers of photoanisotropic materials may be processed with light exposure to form alignment layers with various characteristics. As mentioned previously, in methods to form layers of liquid crystal wherein nanoscaled droplets of liquid crystal are formed, the methods may not include steps related to the formation of alignment layers.

At 705, the second substrate layer may be further processed. An electrode layer may be deposited upon the second substrate layer in an analogous fashion to step 703. Then in some exemplary embodiments, at 706, a dielectric layer may be applied upon the second substrate layer upon the electrode layer. The dielectric layer may be formed to have a variable thickness across its surface. As an example, the dielectric layer may be molded upon the first substrate layer. Alternatively, a previously formed dielectric layer may be adhered upon the electrode surface of the second substrate piece.

At 707, an alignment layer may be formed upon the second substrate layer in similar fashion to the processing step at 704. After 707, two separate substrate layers that may form at least a portion of an ophthalmic lens insert may be ready to be joined. In some exemplary embodiments at 708, the two pieces will be brought in close proximity to each other and then liquid crystal material may be filled in between the pieces. There may be numerous manners to fill the liquid crystal in between the pieces including as non-limiting examples vacuum based filling where the cavity is evacuated and liquid crystal material is subsequently allowed to flow into the evacuated space. In addition, the capillary forces that are present in the space between the lens insert pieces may aid in the filling of the space with liquid crystal material. At 709, the two pieces may be brought adjacent to each other and then sealed to form a variable optic element with liquid crystal. There may be numerous manners of sealing the pieces together, including the use of adhesives, sealants, and physical sealing components such as o-rings and snap lock features as non-limiting examples.

In some exemplary embodiments, two pieces of the type formed at 709 may be created by repeating method steps 701 to 709 wherein the alignment layers are offset from each other to allow for a lens that may adjust the focal power of non-polarized light. In such exemplary embodiments, the two variable optic layers may be combined to form a single variable optic insert. At 710, the variable optic portion may be connected to the energy source and intermediate or attached components may be placed thereon.

At 711, the variable optic insert resulting at step 710 may be placed within a mold part. The variable optic insert may or may not also contain one or more components. In some preferred embodiments, the variable optic insert is placed in the mold part via mechanical placement. Mechanical placement may include, for example, a robot or other automation, such as that known in the industry to place surface mount components. Human placement of a variable optic insert is also within the scope of the present invention. Accordingly, any mechanical placement or automation may be utilized which is effective to place a variable optic insert with an energy source within a cast mold part such that the polymerization of a reactive mixture contained by the mold part will include the variable optic in a resultant ophthalmic lens.

In some exemplary embodiments, a variable optic insert may be placed in a mold part attached to a substrate. An energy source and one or more components may also be attached to the substrate and may be in electrical communication with the variable optic insert. Components may include, for example, circuitry to control power applied to the variable optic insert. Accordingly, in some exemplary embodiments a component includes control mechanism for actuating the variable optic insert to change one or more optical characteristics, such as, for example, a change of state between a first optical power and a second optical power.

In some exemplary embodiments, a processor device, MEMS, NEMS or other component may also be placed into the variable optic insert and in electrical contact with the energy source. At 712, a reactive monomer mixture may be deposited into a mold part. At 713, the variable optic insert may be positioned into contact with the reactive mixture. In some exemplary embodiments the order of placement of variable optic and depositing of monomer mixture may be reversed. At 714, the first mold part is placed proximate to a second mold part to form a lens-forming cavity with at least some of the reactive monomer mixture and the variable optic insert in the cavity. As discussed above, preferred embodiments include an energy source and one or more components also within the cavity and in electrical communication with the variable optic insert.

At 715, the reactive monomer mixture within the cavity is polymerized. Polymerization may be accomplished, for example, via exposure to one or both of actinic radiation and heat. At 716, the ophthalmic lens is removed from the mold parts with the variable optic insert adhered to or encapsulated within the insert-encapsulating polymerized material making up the ophthalmic lens.

Although the invention herein may be used to provide hard or soft contact lenses made of any known lens material, or material suitable for manufacturing such lenses, preferably, the lenses of the invention are soft contact lenses having water contents of about 0 to about 90 percent. More preferably, the lenses are made of monomers containing hydroxy groups, carboxyl groups, or both or be made from silicone-containing polymers, such as siloxanes, hydrogels, silicone hydrogels, and combinations thereof. Material useful for forming the lenses of the invention may be made by reacting blends of macromers, monomers, and combinations thereof along with additives such as polymerization initiators. Suitable materials include silicone hydrogels made from silicone macromers and hydrophilic monomers.

Apparatus

Figure 8:
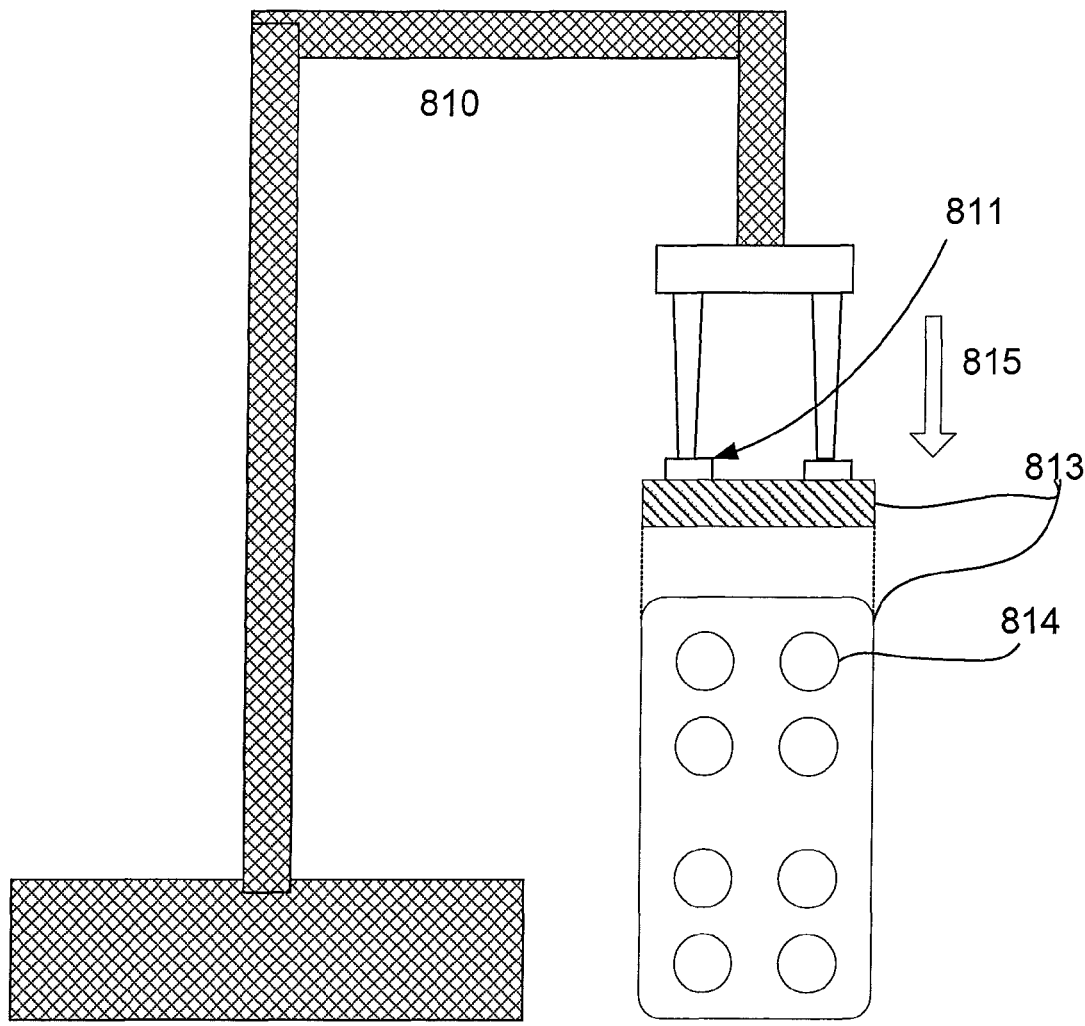
FIG. 8 illustrates an example of apparatus components for placing a variable optic insert comprised of nano-scaled droplets of liquid crystal into an ophthalmic lens mold part.

Referring now to FIG. 8, automated apparatus 810 is illustrated with one or more transfer interfaces 811. Multiple mold parts, each with an associated variable optic insert 814 are contained on a pallet 813 and presented to transfer interfaces 811. Exemplary embodiments, may include, for example a single interface individually placing variable optic insert 814, or multiple interfaces (not shown) simultaneously placing variable optic inserts 814 into the multiple mold parts, and in some exemplary embodiments, in each mold part. Placement may occur via vertical movement 815 of the transfer interfaces 811.

Another aspect of some exemplary embodiments of the present invention includes apparatus to support the variable optic insert 814 while the body of the ophthalmic lens is molded around these components. In some exemplary embodiments the variable optic insert 814 and an energy source may be affixed to holding points in a lens mold (not illustrated). The holding points may be affixed with polymerized material of the same type that will be formed into the lens body. Other exemplary embodiments include a layer of prepolymer within the mold part onto which the variable optic insert 814 and an energy source may be affixed.

Processors Included in Insert Devices

Figure 9:
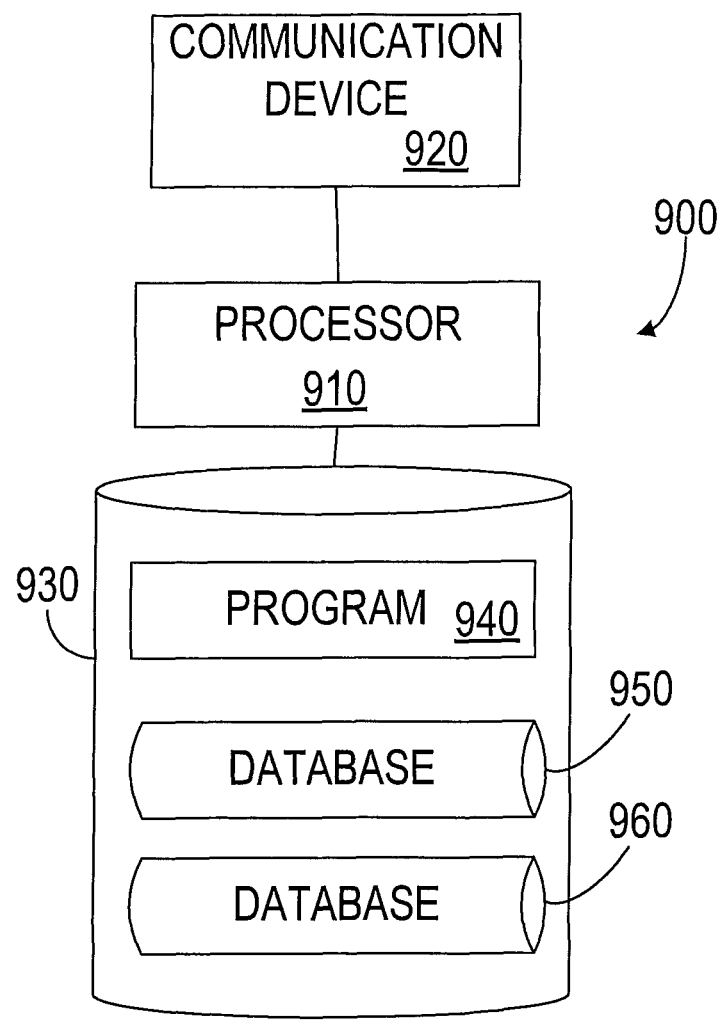
FIG. 9 illustrates a processor that may be used to implement some embodiments of the present invention.

Referring now to FIG. 9, a controller 900 is illustrated that may be used in some embodiments of the present invention. The controller 900 includes a processor 910, which may include one or more processor components coupled to a communication device 920. In some exemplary embodiments, a controller 900 may be used to transmit energy to the energy source placed in the ophthalmic lens.

The controller may include one or more processors, coupled to a communication device configured to communicate energy via a communication channel. The communication device may be used to electronically control one or more of the placement of a variable optic insert into the ophthalmic lens or the transfer of a command to operate a variable optic device.

The communication device 920 may also be used to communicate, for example, with one or more controller apparatus or manufacturing equipment components.

The processor 910 is also in communication with a storage device 930. The storage device 930 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 930 may store a program 940 for controlling the processor 910. The processor 910 performs instructions of the program 940, and thereby operates in accordance with the present invention. For example, the processor 910 may receive information descriptive of variable optic insert placement, processing device placement, and the like. The storage device 930 may also store ophthalmic related data in one or more databases 950, 960. The database 950 and 960 may include specific control logic for controlling energy to and from a variable optic lens.

Figure 10:
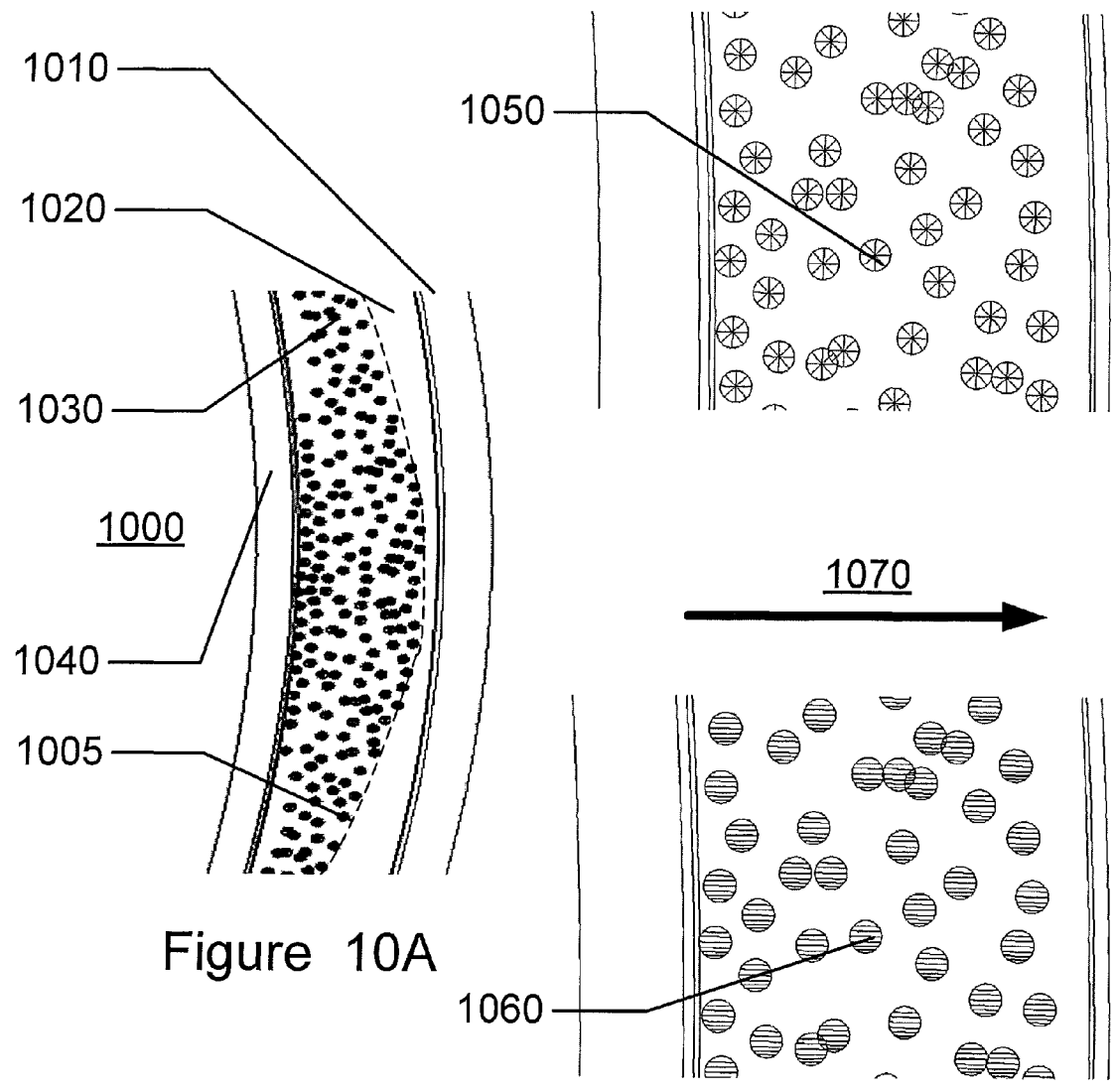
FIGS. 10A, 10B and 10C illustrate an alternative embodiment of a variable optic lens comprising an insert wherein the variable optic portions may be comprised of shaped regions of nano-scaled droplets of liquid crystal.

Liquid Crystal Devices Comprising Layers of Shaped Regions of Nano-Scale Polymer Dispersed Liquid Crystal Droplets Referring to FIGS. 10A-C, an alternative of a variable optic insert 1000 that may be inserted into an ophthalmic lens is illustrated with a liquid crystal layer comprising polymerized regions 1020 and liquid crystal rich droplets 1030. Each of the aspects of the various elements that may be defined around the liquid crystal region may have similar diversity as described in relation to the variable optic insert in FIG. 10A-B. Therefore, there may be a front optic element 1010 and a back optic element 1040 where in some exemplary embodiments these optic elements may have one or more of electrodes, dielectric layers and alignment layers for example upon them. As discussed in previous sections the dielectric layers may be shaped to have regionally varying thicknesses across the device and this may allow for variable electric field across the liquid crystal containing layers. The various embodiments relating to the control and formation of dielectric layers discussed previously and herein are relevant to the exemplary embodiments relating to FIGS. 10 A-C.

Referring to FIG. 10A, a global pattern in the location of droplets may be observed as may be illustrated by the dashed line 1005. The polymerized region around 1020 may be formed in such a manner as to be devoid or relatively devoid of droplets whereas droplets such as 1030 may form in other locations. A shaped profile of droplets, as illustrated by a border at 1005, may define additional means to form devices using a liquid crystal layer of a variable optic insert.

Optical radiation that traverses the liquid crystal layer will have the accumulated effect of the droplet regions that it interacts with. Thus, portions of the layer that present a different number of droplets to light will have a different effective index of refraction to the light. In an alternative interpretation, the thickness of the liquid crystal layer may effectively be considered to vary with the boundary 1005 being defined where there are fewer droplets. Referring to FIG. 10B, the droplets may be nanoscaled and in some embodiments may be formed in a layer with no external orienting aspects. As shown at 1050, the droplets may have a non-aligned and random state for liquid crystal molecules within. Proceeding to FIG. 10C, the application of an electric field 1070 by the application of an electro-potential to electrodes on either side of the liquid crystal layer may result in alignment of the liquid crystal molecules within the droplets as illustrated in the example of item 1060. This alignment will result in a change of the effective index of refraction that a light beam in the vicinity of a droplet will perceive. This coupled with the variation in the density or presence of droplet regions in the liquid crystal layer may form an electrically variable focusing effect by the change of effective index of refraction in an appropriately shaped region containing droplets with liquid crystal molecules. Although the exemplary embodiments with shaped regions of droplets have been illustrated with nano-sized droplets comprising the liquid crystal layers, there may be additional exemplary embodiments that result when the droplets are larger in sized and still further exemplary embodiments may derive from the use of alignment layers in the presence of larger droplet regions.

Figure 11:
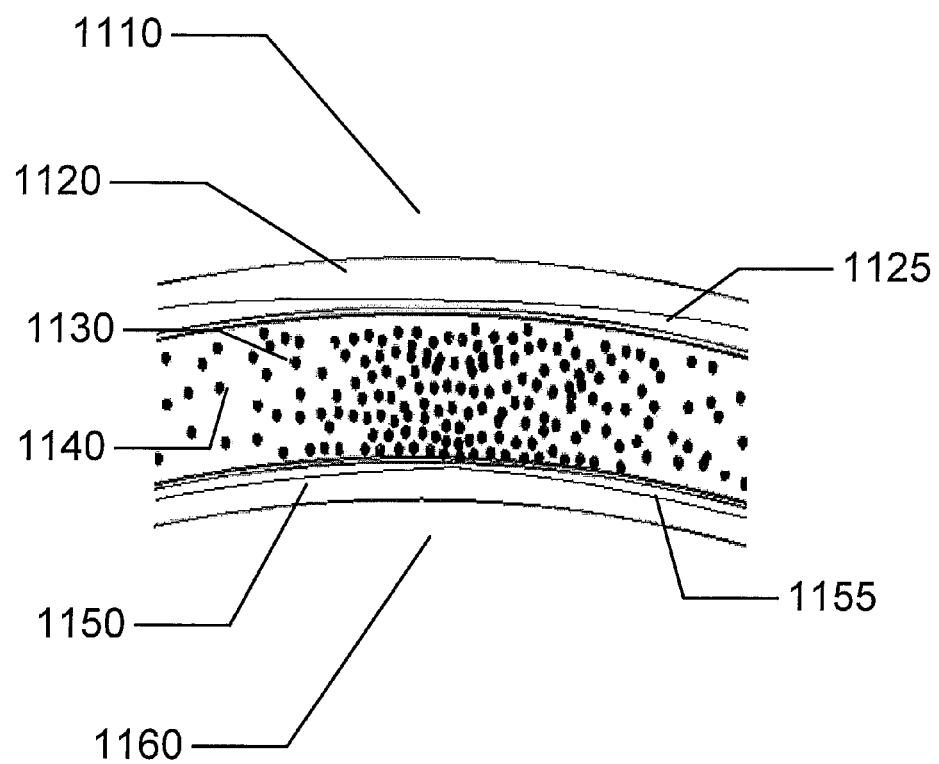
FIGS. 11, 11A, 11B and 11C illustrate an alternative embodiment of a variable optic lens comprising an insert wherein the variable optic portions may be comprised of varied density of nano-scaled droplets of liquid crystal.

Ophthalmic Devices Comprising Polymer Dispersed Liquid Crystal Layers with Varied Density of Liquid Crystal Droplets in the Polymer Layer Referring to FIG. 11, another exemplary embodiment of an ophthalmic device comprising liquid crystal layers may be found. In exemplary embodiments that share similarity to the embodiments related to FIG. 10A, a liquid crystal layer may be formed for optical effects where the density of liquid crystal droplets in the polymer layer is varied across the radial layer in a transverse sense. As depicted in FIG. 11, item 1110 and item 1160 may represent front insert and back insert pieces respectively. Upon these pieces may be layers or combinations of layers represented by 1150 and 1120. The layers 1150 and 1120 may represent electrode layers that may also comprise dielectric layers and/or alignment layers thereupon. As discussed previously, the dielectric layer may be regionally shaped to shape the dielectric field across the liquid crystal layer. As an example the regions indicated by 1125 and 1155 may represented varying shaped dielectric layers as an example. Between the various layers, may be a layer 1140 comprising liquid crystal molecules. The layer 1140 may be processed in such a manner that regions of polymerized material may include droplets containing primarily liquid crystal molecules such as at 1130. In some exemplary embodiments, such as those where the droplet features 1130 are nano-scaled there may not be the need for alignment layers in the structure. In these features the random orientation of the molecules in the liquid crystal containing layers may be desirable.

By controlling the polymerization processing, spatial control of droplet formation may be performed in such a manner that at a particular location of the liquid crystal comprising layer 1140, there may be a different density or amount of liquid crystal material from the front curve insert to the back curve region than at another location. These changes in the amount of liquid crystal material across the lens surface may be useful to program the aggregate index of refraction that light traversing the ophthalmic device would see at a particular region. Optical effects such as spherical focusing and higher order optical effects may be caused to occur. As in previous exemplary embodiments, the establishment of an electric field across the layer 1140 may result in the alteration in alignment of liquid crystal molecules which may result in the establishment of an altered optical effect of the ophthalmic device in an electroactive manner.

Figures 11A, 11B, 11C:
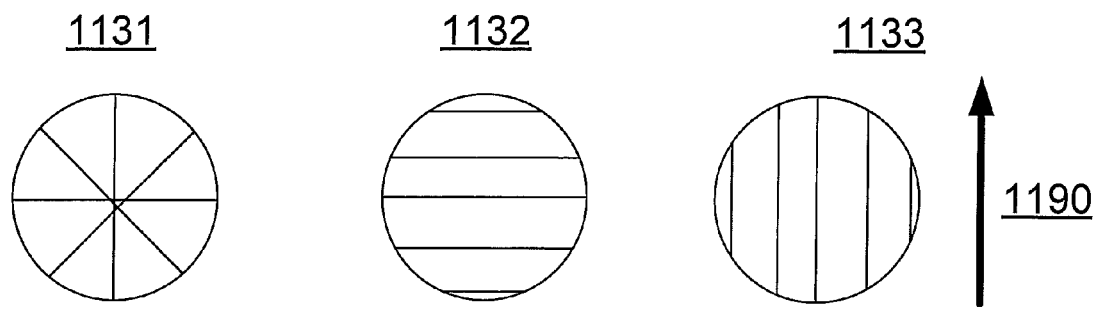

Referring to FIGS. 11A and 11B, individual droplets 1131 of liquid crystal are illustrated to demonstrate the various orientation aspects that may be possible. In some exemplary embodiments, especially where the droplets are of a nanoscaled size, the non-energized orientation at FIG. 11A may have droplets where the liquid crystal molecules exhibit a random orientation pattern as shown. In other exemplary embodiments, the use of alignment layers may create a non-energized orientation configuration where for example the molecules may be aligned parallel to a surface such as shown in FIG. 11B at 1132. In either of these cases when an electric field is applied, 1190, the liquid crystal molecules may align with the electric field as demonstrated in FIG. 11C at 1133.

In this description, reference has been made to elements illustrated in the figures. Many of the elements are depicted for reference to depict the embodiments of the inventive art for understanding. The relative scale of actual features may be significantly different from that as depicted, and variation from the depicted relative scales should be assumed within the spirit of the art herein. For example, liquid crystal molecules may be of a scale to be impossibly small to depict against the scale of insert pieces. The depiction of features that represent liquid crystal molecules at a similar scale to insert pieces to allow for representation of factors such as the alignment of the molecules is therefore such an example of a depicted scale that in actual embodiments may assume much different relative scale.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

The invention claimed is:

1. An ophthalmic lens device with a variable optic insert having an optical zone and a non-optical zone comprising:
 a variable optic insert comprising at least a portion within the optical zone and comprising an insert front curve piece and an insert back curve piece;
 a first layer of electrode material proximate to the back surface of the front curve piece;
 a second layer of electrode material proximate to the front surface of the back curve piece;
 a dielectric film upon at least one of the first layer of electrode material and the second layer of electrode material, wherein the dielectric film has a regionally varying thickness at least in the portion within the optical zone;
 an energy source embedded in the insert in at least a region comprising the non-optical zone; and
 the variable optic insert comprising a layer containing liquid crystal material, wherein the layer containing liquid crystal material comprises a polymer layer with separated droplets of liquid crystal material.

2. The ophthalmic lens device of claim 1, wherein the separated droplets of liquid crystal material have an average diameter less than approximately 1 micron in size.

3. The ophthalmic lens device of claim 2, wherein within the layer containing liquid crystal material comprising separated droplets of liquid crystal material the region comprising the droplets is a subset of the layer comprising liquid crystal material and has a shaped profile capable of causing an optical effect supplementary to an effect of the different dielectric films upon at least one of the first electrode layer and the second electrode layer.

4. The ophthalmic lens device of claim 2, wherein within the layer containing liquid crystal material comprising a polymer layer with separated droplets of liquid crystal material, the density of the droplets is spatially varied such that the variation is capable of causing an optical effect supplementary to the effect of the different radii of insert surfaces.

5. The ophthalmic lens device of claim 2, wherein the lens is a contact lens.

6. The ophthalmic lens device of claim 5, wherein the shape of the insert front piece and the insert back piece compensates for the thickness variation of the dielectric film such that the liquid crystal layer is approximately uniform in thickness at least in a region comprising the optical zone.

7. The ophthalmic lens device of claim 6, wherein the layer of liquid crystal material varies its index of refraction affecting a ray of light traversing the layer of liquid crystal material when an electric potential is applied across the first layer of electrode material and the second layer of electrode material.

8. The ophthalmic lens device of claim 7, wherein the variable optic insert alters a focal characteristic of the lens.

9. The ophthalmic lens device of claim 8, further comprising a circuit, wherein the electrical circuit controls the flow of electrical energy from the energy source to the first and second electrode layers.

10. The ophthalmic lens device of claim 9, wherein the electrical circuit comprises a processor.

11. An ophthalmic lens device with a variable optic insert having an optical zone and a non-optical zone comprising:
a variable optic insert comprising at least a portion within the optical zone, and comprising an insert front curve piece, an intermediate curve piece and an insert back curve piece;
a first layer of electrode material proximate to the back surface of the front curve piece;
a second layer of electrode material proximate to the front surface of the intermediate curve piece;
a dielectric film upon at least one of the first layer of electrode material and the second layer of electrode material, wherein the dielectric film has a regionally varying thickness at least in a portion within the optical zone;
an energy source embedded in the insert in at least a region comprising the non-optical zone; and
the variable optic insert comprising at least a first layer containing liquid crystal material, wherein the first layer containing liquid crystal material comprises a polymer layer with separated droplets of liquid crystal material.

12. The ophthalmic lens device of claim 11, wherein: the separated droplets of liquid crystal material have an average diameter less than 1 micron in size.

13. The ophthalmic lens device of claim 12, wherein within the layer comprising a polymer layer with separated droplets of liquid crystal material the density of the droplets is spatially varied such that the variation is capable of causing an optical effect supplementary to the effect of the different radii of insert surfaces.

14. The ophthalmic lens device of claim 12, wherein the lens is a contact lens.

15. The ophthalmic lens device of claim 14, wherein the shape of the insert front piece and the insert back piece compensates for the thickness variation of the dielectric film such that the liquid crystal layer is approximately uniform in thickness at least in a region comprising the optical zone.

16. The ophthalmic lens device of claim 15, wherein the layer of liquid crystal material varies its index of refraction affecting a ray of light traversing the layer of liquid crystal material when an electric potential is applied across the first layer of electrode material and the second layer of electrode material.

17. The ophthalmic lens device of claim 16, wherein the variable optic insert alters a focal characteristic of the lens.

18. The ophthalmic lens device of claim 17, further comprising an electrical circuit, wherein the electrical circuit controls the flow of electrical energy from the energy source to the first and second electrode layers.

19. The ophthalmic lens device of claim 18, wherein the electrical circuit comprises a processor.

20. The ophthalmic lens device of claim 12, wherein within the layer comprising a polymer layer with separated droplets of liquid crystal material, the region comprising the droplets is a subset of the layer comprising liquid crystal material and has a shaped profile capable of causing an optical effect supplementary to an effect of the different dielectric films upon at least one of the first electrode layer and the second electrode layer.

* * * * *